US009230411B2

(12) United States Patent
Englman et al.

(10) Patent No.: US 9,230,411 B2
(45) **Date of Patent: *Jan. 5, 2016**

(54) GAMING MACHINE HAVING AN ENHANCED GAME PLAY SCHEME

(71) Applicant: WMS Gaming Inc., Waukegan, IL (US)

(72) Inventors: Allon G. Englman, Chicago, IL (US); Joel R. Jaffe, Glenview, IL (US); Wayne H. Rothschild, Northbrook, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/898,988

(22) Filed: May 21, 2013

(65) Prior Publication Data

US 2013/0252708 A1 Sep. 26, 2013

Related U.S. Application Data

(60) Continuation of application No. 12/882,656, filed on Sep. 15, 2010, now Pat. No. 8,444,467, which is a continuation of application No. 12/351,433, filed on Jan. 9, 2009, now Pat. No. 7,819,737, which is a (Continued)

(51) Int. Cl.
*G06F 17/00* (2006.01)
*G07F 17/34* (2006.01)
*G07F 17/32* (2006.01)

(52) U.S. Cl.
CPC ................ *G07F 17/34* (2013.01); *G07F 17/32* (2013.01); *G07F 17/3244* (2013.01)

(58) Field of Classification Search
USPC ....................................... 463/2, 5, 16–29, 43
See application file for complete search history.

(56) References Cited

U.S. PATENT DOCUMENTS 5,632,485 A 5/1997 Woodland et al.
5,720,662 A 2/1998 Holmes, Jr. et al.

(Continued)

FOREIGN PATENT DOCUMENTS

WO 97/19736 6/1997
WO 00/32286 6/2000

(Continued)

OTHER PUBLICATIONS

WMS Gaming Inc., "Big Bang Piggy Bankin™", Product Sheet, (1997), (undated), 2 pages.

(Continued)

*Primary Examiner* — Ronald Laneau
(74) *Attorney, Agent, or Firm* — Nixon Peabody LLP

(57) ABSTRACT

A gaming machine having an enhanced game play scheme is provided where, in response to receipt of a second wager to select an option, a player is provided with enhanced game play. Enhanced game play may include (1) providing more frequent bonus game play, (2) providing a larger bonus game value payout, (3) providing more frequent bonus game play and providing a larger bonus game value payout, (4) providing a larger or multiplied game value payout, (5) providing a guaranteed value payout for a non-winning outcome, (6) providing game features (7) providing a larger game value payout based on a partial game outcome, (8) providing an extra wild symbol capable of repositioning, and (9) providing a possibility of an additional reel movement to reposition an extra reel symbol or (10) providing a possibility of an extra pay line to include an extra reel symbol to increase a value payout.

40 Claims, 23 Drawing Sheets

Related U.S. Application Data division of application No. 10/867,269, filed on Jun. 14, 2004, now abandoned, which is a continuation-in-part of application No. 10/731,941, filed on Dec. 10, 2003, now abandoned.

(56) References Cited

U.S. PATENT DOCUMENTS

| | | | | |
|---|---|---|---|---|
| 5,851,148 | A | 12/1998 | Brune et al. | |
| 6,056,642 | A | 5/2000 | Bennett | |
| 6,068,552 | A | 5/2000 | Walker et al. | |
| 6,089,977 | A | 7/2000 | Bennett | |
| 6,110,041 | A | 8/2000 | Walker et al. | |
| 6,120,378 | A | 9/2000 | Moody et al. | |
| 6,155,925 | A | 12/2000 | Giobbi et al. | |
| 6,159,095 | A | 12/2000 | Frohm et al. | |
| 6,179,711 | B1 | 1/2001 | Yoseloff | |
| 6,190,255 | B1 | 2/2001 | Thomas et al. | |
| 6,203,429 | B1 | 3/2001 | Demar et al. | |
| 6,210,277 | B1 | 4/2001 | Stefan | |
| 6,227,969 | B1 | 5/2001 | Yoseloff | |
| 6,237,916 | B1 | 5/2001 | Webb | |
| 6,251,013 | B1 | 6/2001 | Bennett | |
| 6,254,481 | B1 | 7/2001 | Jaffe | |
| 6,261,178 | B1 | 7/2001 | Bennett | |
| 6,270,411 | B1 | 8/2001 | Gura et al. | |
| 6,350,199 | B1 | 2/2002 | Williams et al. | |
| 6,419,579 | B1 | 7/2002 | Bennett | |
| 6,517,433 | B2 | 2/2003 | Loose et al. | |
| 6,520,856 | B1 | 2/2003 | Walker et al. | |
| 6,561,904 | B2 | 5/2003 | Locke et al. | |
| 6,746,328 | B2 | 6/2004 | Cannon et al. | |
| 6,793,578 | B2 | 9/2004 | Luccesi et al. | |
| 6,960,133 | B1 | 11/2005 | Marks et al. | |
| 7,445,548 | B1 | 11/2008 | Muskin | |
| 7,494,415 | B2 | 2/2009 | Nakajima | |
| 7,862,421 | B2 | 1/2011 | Marks et al. | |
| 8,092,299 | B2 | 1/2012 | Cohen et al. | |
| 8,328,633 | B2 | 12/2012 | Cohen et al. | |
| 2002/0020965 | A1 | 2/2002 | Potter | |
| 2002/0055382 | A1 | 5/2002 | Meyer | |
| 2002/0086725 | A1 | 7/2002 | Fasbender et al. | |
| 2002/0142825 | A1 | 10/2002 | Lark et al. | |
| 2002/0142846 | A1 | 10/2002 | Paulsen | |
| 2002/0155881 | A1 | 10/2002 | Yoshida | |
| 2002/0190469 | A1 | 12/2002 | Conklin et al. | |
| 2002/0196342 | A1 | 12/2002 | Walker et al. | |
| 2003/0027626 | A1 | 2/2003 | Marks et al. | |
| 2003/0060269 | A1 | 3/2003 | Paulsen et al. | |
| 2003/0064797 | A1 | 4/2003 | Jackson et al. | |
| 2003/0064800 | A1 | 4/2003 | Jackson et al. | |
| 2003/0119579 | A1 | 6/2003 | Walker et al. | |
| 2003/0162585 | A1 | 8/2003 | Bigelow et al. | |
| 2003/0216169 | A1 | 11/2003 | Walker et al. | |
| 2003/0216170 | A1 | 11/2003 | Walker et al. | |
| 2004/0053683 | A1 | 3/2004 | Hartl et al. | |
| 2004/0092299 | A1 | 5/2004 | Gauselmann | |
| 2004/0092300 | A1 | 5/2004 | Gauselmann | |
| 2004/0100025 | A1 | 5/2004 | Conklin et al. | |
| 2004/0219968 | A1 | 11/2004 | Fiden et al. | |
| 2004/0219969 | A1 | 11/2004 | Casey et al. | |
| 2004/0242316 | A1 | 12/2004 | Oles et al. | |
| 2004/0266507 | A1 | 12/2004 | Cooper | |
| 2005/0054412 | A1 | 3/2005 | Gauselmann | |
| 2005/0130731 | A1 | 6/2005 | Englman et al. | |
| 2005/0130737 | A1 | 6/2005 | Englman et al. | |
| 2005/0192073 | A1 | 9/2005 | Nakajima | |
| 2006/0211484 | A1 | 9/2006 | Hornik et al. | |
| 2009/0104969 | A1 | 4/2009 | Paulsen et al. | |
| 2012/0115594 | A1 | 5/2012 | Hornik et al. | |
| 2013/0244766 | A1* | 9/2013 | Jaffe | 463/25 |
| 2013/0288782 | A1* | 10/2013 | Hornik et al. | 463/25 |
| 2014/0038701 | A1* | 2/2014 | Allen et al. | 463/25 |
| 2014/0094265 | A1* | 4/2014 | Aoki et al. | 463/20 |

FOREIGN PATENT DOCUMENTS

| | | |
|---|---|---|
| WO | 01/15055 | 3/2001 |
| WO | 01/33478 | 5/2001 |
| WO | 02/054331 | 7/2002 |
| WO | 03/089084 | 10/2003 |

OTHER PUBLICATIONS

WMS Gaming Inc., "Stroke of Luck™", Product Sheet, (undated), 2 pages.

WMS Gaming Inc., "Top Cat™", Product Sheet, (undated), 2 pages.

WMS Gaming Inc., "Winning Streak™", Product Sheet, (undated), 2 pages.

* cited by examiner

500

GAMING MACHINE HAVING AN ENHANCED GAME PLAY SCHEME

REFERENCE TO RELATED APPLICATIONS

This application is a Continuation of U.S. patent application Ser. No. 12/882,656, filed Sep. 15, 2010, and titled "Gaming Machine Having An Enhanced Game Play Scheme," now allowed, which is a Continuation of U.S. patent application Ser. No. 12/351,433, filed Jan. 9, 2009, and titled "Gaming Machine Having An Enhanced Game Play Scheme," now allowed as U.S. Pat. No. 7,819,737 on Oct. 26, 2010, which is a Divisional of U.S. patent application Ser. No. 10/867,269, filed Jun. 14, 2004, and titled "Gaming Machine Having An Enhanced Game Play Scheme," which is a Continuation-In-Part of U.S. patent application Ser. No. 10/731,941, filed Dec. 10, 2003, and titled "Gaming Machine Having An Enhanced Game Play Scheme." This application is related to U.S. patent application Ser. No. 10/428,516, filed May 1, 2003, and titled "Gaming Machine With Interactive Pop-Up Windows," and to U.S. patent application Ser. No. 10/832,564, filed Apr. 27, 2004, and titled "Gaming Machine With Interactive Pop-Up Windows Providing Enhanced Game Play Schemes," now issued as U.S. Pat. No. 7,618,319 on Nov. 17, 2009, each of which is incorporated herein by reference in its entirety.

FIELD OF THE DISCLOSURE

This invention is directed to gaming machines, and more particularly, to a gaming machine having an enhanced game play scheme.

BACKGROUND

Gaming machines providing base games such as electronically driven video slots, video poker, video blackjack, video keno, video bingo, video pachinko, video lottery, and mechanically driven reel slots, etc., are well known in the gaming industry. Generally gaming machines are configured to operate as "stand-alone" units (that may or may not be coupled to a backroom computer) where the outcome of game play is "locally determined", or as part of a server-based gaming network where the outcome of game play may be either locally determined or "centrally determined".

Slot games provided by either video slot machines or mechanical spinning reel slot machines have proven to be one of the most popular wagering games. As a result, slot game designers continually seek ways to improve game play and increase coin-in revenue per wagering game (e.g., the amount wagered by the player per game). For example, competition for slot game players has resulted in game designs with lower game play denominations for those players desiring maximum game play time for their coin-in. Competition has also resulted in slot game designs with higher numbers of pay lines to increase an occurrence of a winning symbol combination per wagering game and to increase coin-in revenue per wagering game. There is a visual limit, however, to the maximum number of pay lines that can be offered per wagering game.

Bonus games are also utilized to attract slot game players and to increase coin-in revenue per wagering game. Bonus games, typically initiated by an occurrence of a bonus triggering event occurring during slot game play, are desirable because they generally result in some type of win for the player. For example, some bonus games associated with slot game play provide "free" spins to the player.

Because of the popularity of bonus games, gaming machine manufacturers have attempted to use them to as a basis to increase coin-in revenue per wagering game played. For example, one bonus scheme allows a player to buy a chance to participate in a bonus game where bonus game play may yield a progressive jackpot. This chance to participate in the bonus game is provided to the player in exchange for the player providing "additional coin-in" (i.e., coin-in that is above what is required for standard base game play on the gaming machine). Although this scheme does result in an increased coin-in amount per slot game played, the additional coin-in amounts are utilized to fund the progressive jackpot rather than to increase coin-in revenues per game.

Another bonus scheme allows a player to pay 5 addition credits per spin (multiplied by the amount bet per line) to possibly qualify for bonus game play if a bonus triggering event occurs during the reel spin and if the player has selected the maximum number of pay lines bet per game. Without the 5 additional credits per spin per pay line, bonus game play will never be triggered. Thus, for a player desiring a possible chance to participate in bonus game play, the player's coin-in must increase from 20 credits to 25 credits per pay line selected. Although this scheme does result in an increased coin-in revenue amount per game, the player must always select to play the maximum number of pay lines; a costly proposition for the player just to have a possible chance to participate in bonus game play.

SUMMARY OF THE INVENTION

In general, the present invention provides a gaming machine having an enhanced game play scheme where, in response to a first wager for base game play plus additional coin-in per game (a second wager), a player has an opportunity for enhanced game play. In other words, for additional coin-in per game, an existing aspect of game play is enhanced. Therefore, depending on the gaming machine configuration, the additional coin-in per game may result in one of a number enhanced game play schemes that increase player excitement while at the same time, increase coin-in revenue per game played.

In one embodiment, the additional coin-in per game may result in more frequent bonus game play via lowering a threshold for a bonus triggering event to occur.

In another embodiment, the additional coin-in per game may result in an enhanced or "supersized" bonus game to be awarded to the player when bonus game play is triggered. Enhanced bonus game play results in a higher value payout average than standard bonus game play.

In a yet another embodiment, the additional coin-in per game may result in an enhanced bonus game having a lower threshold for a bonus triggering event to occur; a combination enhanced bonus game scheme.

In a further embodiment, the additional coin-in per game may result in a winning symbol combination paying an enhanced award associated with an enhanced pay table rather than paying a standard award associated with a standard pay table.

In further additional embodiment, the additional coin-in per game may result in a winning symbol combination paying an enhanced award corresponding to a multiplied value payout for a winning game outcome.

In yet an additional embodiment, the additional coin-in per game may result in a modified value payout scheme after displaying a partial game outcome.

In another further embodiment, the additional coin-in per game may enable player pre-spin reel set-up in the case of a slot machine.

In yet a further embodiment, the additional coin-in per game may operate as insurance yielding a guaranteed value payout in the event of a non-winning outcome of game play.

In an additional embodiment, the additional coin-in per game may be collected after the initial wager at a time when the game outcome is only partially displayed. The additional coin-in per game results in a larger value payout in the event of a winning outcome.

In yet an additional embodiment, the additional coin-in per game may activate game features.

In another additional embodiment, the additional coin-in per game may activate one or more special reel symbol(s) capable of being repositioned within an outcome symbol array to yield a higher value payout.

In another further embodiment, the additional coin-in per game may activate additional reel movement after the outcome symbol array is displayed to reposition an extra reel symbol into the outcome symbol array and yield a higher value payout.

In yet another further embodiment, the additional coin-in per game may activate a possibility of generating an extra pay line that includes an extra reel symbol if the extra pay line results in a higher value payout.

Additional aspects of the invention will be apparent to those of ordinary skill in the art in view of the detailed description of various embodiments, which is made with reference to the drawings, a brief description of which is provided below.

DESCRIPTION OF THE PREFERRED EXAMPLES

Figure 1:
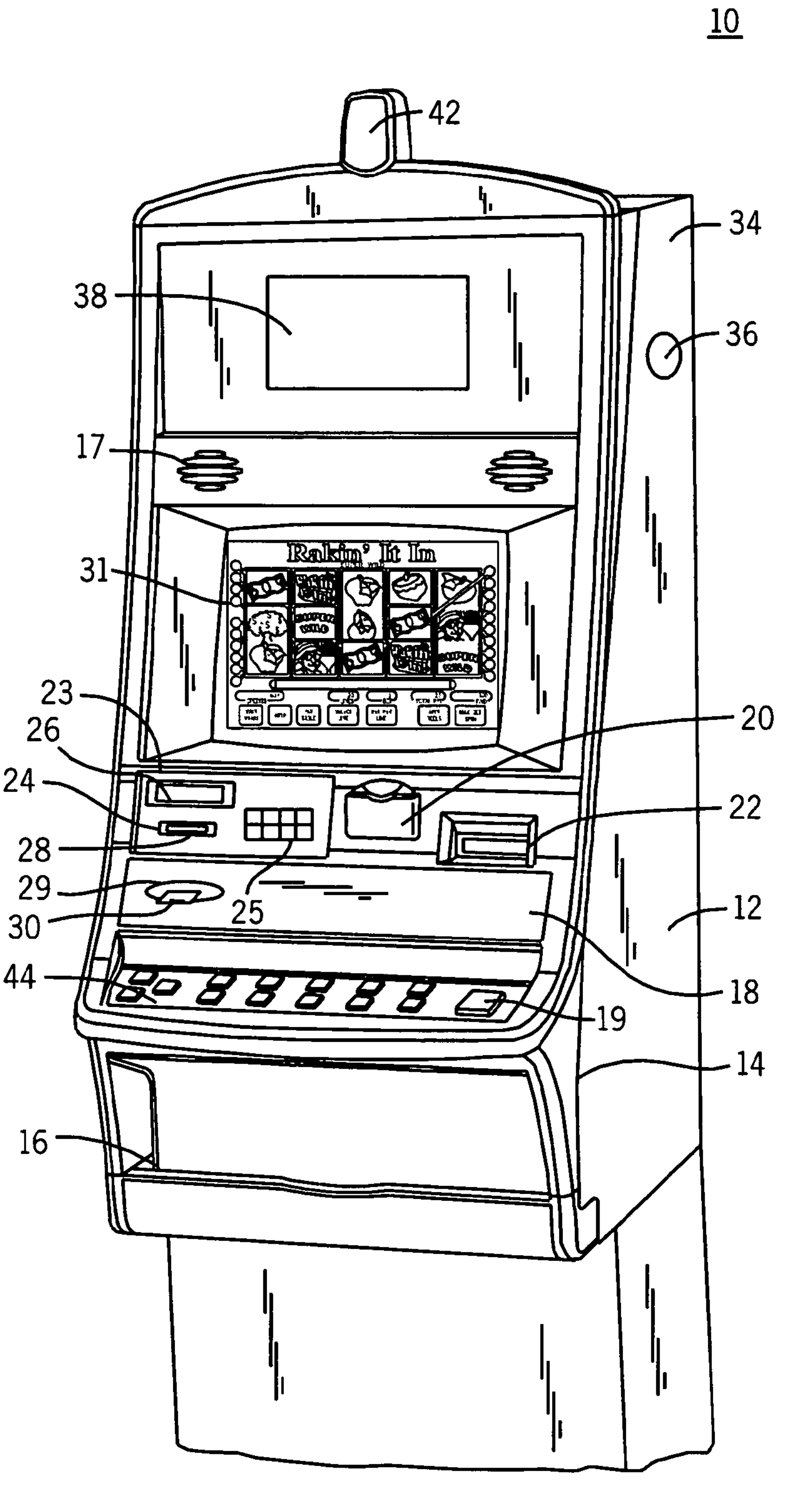
FIG. 1 is a perspective view of an embodiment of a gaming machine having an enhanced game play scheme in accordance the invention.

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

In general, the present invention provides a gaming machine having a number of enhanced game play schemes where, in response to receipt of a second wager to select an option for enhanced game play, a player is provided with enhanced game play. The option may be provided before or after a first wager from the player. Enhanced game play may include (1) providing more frequent bonus game play, (2) providing a larger value payout for bonus game play, (3) providing more frequent bonus game play and providing a larger payout for bonus game play, (4) providing a larger value payout for base game play, (5) providing a guaranteed payout at a predetermined value if a game outcome is a non-winning outcome, (6) providing one or more game features, (7) providing a multiplied value payout, (8) enabling the player to manually adjust the reel symbol array prior to a game play reel spin, (9) providing a larger value payout for base game play if, after a partial game outcome is displayed, the player selects the option, (10) activating an extra wild symbol capable of being repositioned within an outcome symbol array to yield a higher value payout, (11) providing a possibility of an additional movement of a reel to reposition an extra reel symbol, above or below the outcome symbol array, into the outcome symbol array to yield a higher value payout, or (12) providing a possibility of generating an extra pay line that includes an extra reel symbol, above or below an outcome symbol array, if the extra pay line results in a higher value payout, to name a few.

As described below, the present invention is preferably implemented using a video slot machine. It is contemplated that the present invention may also be implemented using other types of video gaming machines or, in some cases, using an adaptable mechanical spinning reel gaming machine having flat panel transmissive display positioned in front of the mechanical spinning reels. The flat panel transmissive display is adapted to, among other things, superimpose video images upon the mechanical spinning reels. A mechanical spinning reel gaming machine with superimposed video images generated by a flat panel transmissive display is described in U.S. Pat. No. 6,517,433, entitled "Reel Spinning Slot Machine With Superimposed Video Image", naming Loose et al. as inventors, filed May 22, 2001 ("the Loose et al. patent"), and herein incorporated by reference in its entirety.

An advantageous feature of the gaming machine having an enhanced game play scheme is that, in response to an additional wager per game, a player has an opportunity for enhanced game play, thereby increasing player enjoyment and increasing coin-in revenue per game. Thus, unlike prior art schemes that allow a player to become eligible for possible game play (e.g., bonus game play, progressive jackpot game play) via an additional wager, the gaming machine having one or more enhanced game play scheme allows a player "supersize" existing game play by enhancing base game play, enhancing bonus game play, enhancing the frequency of bonus game play, enhancing pay table value payouts, multiplying value payouts, pre-configuring symbol arrays, etc., via placing a second, or additional wager.

FIG. 1 is a perspective view of one possible embodiment of a gaming machine 10 offering an enhanced game play scheme. The gaming machine 10 may be configured as a stand-alone gaming machine or may be configured as part of a server-based gaming network having one or more coupled servers and a number of additional gaming machines. The gaming machine 10 may be any type of wagering gaming machine offering the enhanced game play scheme and may therefore have varying structures and methods of operation. For example, the gaming machine 10 may be a video gaming machine configured to play a video wagering game, or it may be a mechanical spinning reel slot machine (with or without an arm mechanism). For exemplary purposes, various elements of the gaming machine 10 are described below, but it should be understood that numerous other elements may exist and may be utilized in any number of combinations to create a variety of gaming machine types.

Referring to FIG. 1, the gaming machine 10 includes a cabinet 12 having a door 14 to provide access to the interior of the gaming machine 10. Attached to the door 14 are audio speaker grills 17 and a belly glass area 18 that typically displays game theme artwork. Sounds provided via the audio speaker grills 17 and associated audio speakers may include the sound of spinning slot machine reels, a dealer's voice, music, announcements or any other audio related to the wagering game.

Also attached to the door 14 are a number of value input devices that allow a player to insert value for game play. The value input devices may include a coin slot acceptor 20 or a note acceptor 22 to input value to the gaming machine 10. The note acceptor 22 may accept value in any number of forms, including currency or a currency-sized paper ticket voucher inscribed with information such as a bar code representing value, the name of the casino, the date, etc. As used herein, the term "value" may encompass gaming tokens, coins, paper currency, ticket vouchers, credit or debit cards, smart cards, and any other object representative of value.

The gaming machine 10 may also include a player tracking area 23 having a card reader 24, a keypad 25 and a small display 26. As will be appreciated by those of ordinary skill in the art, the player tracking area 23 may be located in any number of areas of the gaming machine 10. The small display 26 may be implemented using a vacuum fluorescent display (VFD), a liquid crystal display (LCD), an LED display, and/or a touch screen to display information to a game player or casino employee. The card reader 24 may include any type of card reading device, such as a magnetic card reader, memory card reader, an optical card reader, etc. The card reader 24 may be used to read data from a card (e.g., a credit card, a player tracking card, a smart card, etc.) offered by a player. If provided for player tracking purposes, the card reader 24 may be used to read data from, and/or write data to, cards capable of storing data. Such data may include the identity of a player, the identity of a casino, the player's gaming habits, etc. Once gathered, the data can be "mined" (i.e., the data is sorted to identify patterns and establish relationships) for any number of purposes including administering player awards, distinguishing player preferences and habits, accounting, etc.

The gaming machine 10 also includes a main display device 31 for displaying video game images (e.g., simulated reel symbols, simulated cards, simulated numbers, etc.), or in the case of a mechanical spinning reel slot machine, for displaying a symbol array of artwork and blank symbols affixed to mechanical spinning reels viewable to the player. The symbol array may include occurrences of non-winning symbol combinations where no value payout is awarded to the player, or occurrences of winning symbol combinations (reflected in a pay table) where value payouts are awarded to the player. In addition, the main display device 31 may display animation, 2-D or 3-D images and digital video playback.

For video gaming machines, the main display device 31 may be implemented as a CRT, an LCD, a VFD, a plasma display, an organic liquid crystal display or other type of video display suitable for use in a gaming machine, and includes a touch screen. For example, in a video gaming machine offering a slot game, the main display device 31 may include an LCD-TFT display displaying video reel artwork symbols and blank symbols.

For mechanical spinning reel slot machines, the main display device 31 includes a reel display area and may additionally include a touch screen. Alternatively, the touch screen may be provided at a location disposed part from the main display device 31. The reel display area is adapted to display game information to a player while, at the same time, allowing the player to view a reel symbol array provided by the stopped mechanical spinning reels. The game information displayed to the player may include game denominations, available credits, pay lines, wagering information, and other suitable game information. When the mechanical spinning reels are rotated and stopped, the resulting symbol array in conjunction with game information displayed in the reel display area provide a game outcome and game status to the player.

Referring again to FIG. 1, the gaming machine 10 may also include a box top 34 having additional speaker(s) 36 and a top box display device 38. Although not separately illustrated, the top box display device 38 may include a camera and/or a microphone, and/or physical objects such as mechanical reels, wheels, or dice. The top box display device 38, if configured as a dynamic display (e.g., a flat panel video display), may enable a number of game enhancements such as bonus games, interactive tournament games, progressive jackpot games, etc. Alternatively, the top box display device 38, if configured as a static display, may display award information such as pay tables for base or bonus games via glass art.

The gaming machine 10 may also include a player control panel 44. The player control panel 44 includes a number of pushbuttons or touch-sensitive areas (i.e., touch screen) that may be pressed by the player to select games, make wagers, make gaming decisions, etc. As used herein, the term "button" is intended to encompass any device that allows a player to make an input, such as a mechanical input device that must be depressed to make an input selection or a display area that a player may simply touch. The number of pushbuttons may include one or more "Bet" buttons for wagering, a "Max Bet" button for making the maximum wager allowable for the game, a "Play" button for beginning pay, a "Repeat" button for repeating the previous wagering selection, a "Collect" button for terminating play and cashing out of the game, a "Help" button for viewing a help screen, a "See Pays" button for causing the main display device 31 to generate one or more display screens showing the odds or payout information for the game or games provided by the gaming machine 10, and a "Call Attendant" button for calling an attendant. Further, although the player control panel 44 is shown to be separate from the main display device 31, it should be understood that the control panel 44 could be generated as a touch-sensitive screen by the main display device 31.

Referring again to FIG. 1, when a player inserts value in the gaming machine 10, credits corresponding to the amount deposited are displayed on a credit meter of the gaming machine 10. After depositing the appropriate amount of value and making appropriate selections, the player begins base game play by pulling a mechanical arm or by pushing an appropriate button such as a Bet button, a Max Bet button, or a Play button on the player control panel 44. Subsequent game play outcome displayed via the main display device 31 may be determined either centrally or locally (1) using a random number generator (RNG) resulting in a pseudo random set of outcomes, or (2) by selecting a game outcome from a fixed set of outcomes (pooled), or (3) other suitable technique. In addition, when triggered by a bonus triggering event such as an occurrence of selected symbols, a bonus game may be made available to the player. Like base game play, an outcome associated with bonus game play may be determined using an RNG, a fixed set of outcomes, or other suitable technique. Additional details describing enhanced game play on the gaming machine 10 having an enhanced game play scheme are included below as described in connection with FIGS. 3-23.

Figure 2:
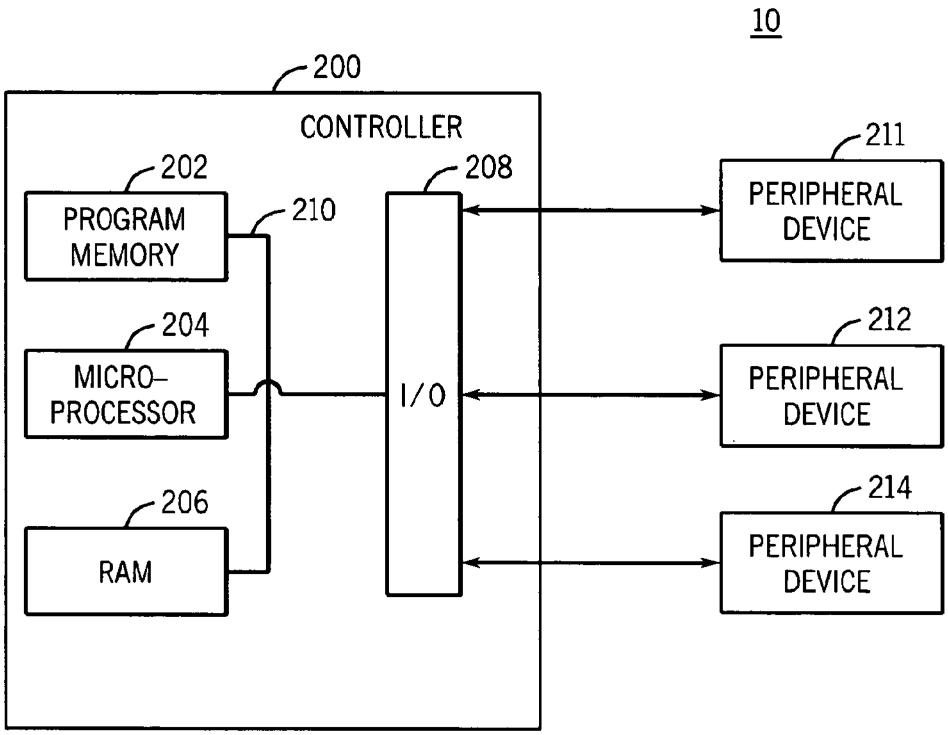
FIG. 2 is a block diagram of the electronic components of the gaming machine of FIG. 1.

FIG. 2 is a block diagram of a number of components that may be incorporated in the gaming machine 10 of FIG. 1. Referring to FIG. 2, the gaming machine 10, includes a controller 200 that may comprise a program memory 202 (including a read only memory (ROM)), a microcontroller-based platform or microprocessor (MP) 204, a random-access memory (RAM) 206 and an input/output (I/O) circuit 208, all of which may be interconnected via a communications link, or an address/data bus 210. The microprocessor 204 is capable of displaying images, symbols and other indicia such as characters, people, places, things, and faces of cards. The RAM 206 is capable of storing event data or other data used or generated during a particular game. The program memory 202 is capable of storing program code that controls the gaming machine 10 so that it plays a particular game in accordance with applicable math models, game rules, and pay tables. For example, when an additional coin-in amount is received for a wager, the microprocessor 204, executing code in the program memory 202, causes a bonus triggering event to occur and then enables subsequent bonus game play.

It should be appreciated that although only one microprocessor 204 is shown, the controller 200 may include multiple microprocessors 204. For example, the controller 200 may include one microprocessor for executing low level gaming functions and another processor for executing higher-level game functions such as some communications, security, maintenance, etc. Similarly, the memory of the controller 200 may include multiple RAMs 206 and multiple program memories 202, depending on the requirements of the gaming machine 10. Although the I/O circuit 208 is shown as a single block, it should be appreciated that the I/O circuit 208 may include a number of different types of I/O circuits. The RAM(s) 206 and program memory(s) 202 may be implemented as semiconductor memories, magnetically readable memories, and/or optically readable memories, etc. Further, the term "controller" is used herein to refer collectively to the program memory 202, the microprocessor 204, the RAM 206 and the I/O circuit 208.

FIG. 2 illustrates that multiple peripheral devices, depicted as peripheral devices 211, 212, and 214, may be operatively coupled to the I/O circuit 208. The peripheral devices may include a control panel with buttons, a coin slot acceptor, a note acceptor, a bill validator, a card reader, a keypad, a sound circuit driving speakers, a card reader display, a video display, a touch screen, etc. In the case of a spinning reel slot machine, the peripheral devices may include a number of electro-mechanical spinning reels and a mechanical arm similarly coupled to the I/O circuit 208. Although three peripheral devices are depicted, more or less peripheral devices may be included.

It should be appreciated that although the controller 200 is a preferable implementation of the present invention, the present invention also includes implementation via one or more application specific integrated circuits (ASICs), field programmable gate arrays (FPGA), adaptable computing integrated circuits, one or more hardwired devices, or one or more mechanical devices.

One manner in which the gaming machine 10 may operate is described below in connection with one or more flowchart(s) that represents a number of portions or routines of one or more computer programs, which may be stored in one or more of the memories of the controller 200. The computer program(s) or portions thereof may also be stored remotely, outside of the gaming machine 10 and may therefore control the operation from a remote location.

As previously discussed, unlike prior art schemes that allow a player to be eligible for possible game play (e.g., bonus game, progressive jackpot) only via additional coin-in, the gaming machine 10 having an enhanced game play scheme allows a player to optionally "upgrade" game play by enhancing existing base game play, enhancing existing bonus game play, enhancing the frequency of bonus game play, enhancing pay table value payouts, etc. In an embodiment, player selection of the enhanced game play may be made prior to initiating the game outcome. In another embodiment (see, FIG. 4) player selection of the enhanced game play may be made after a partial game outcome is displayed.

Figure 3:
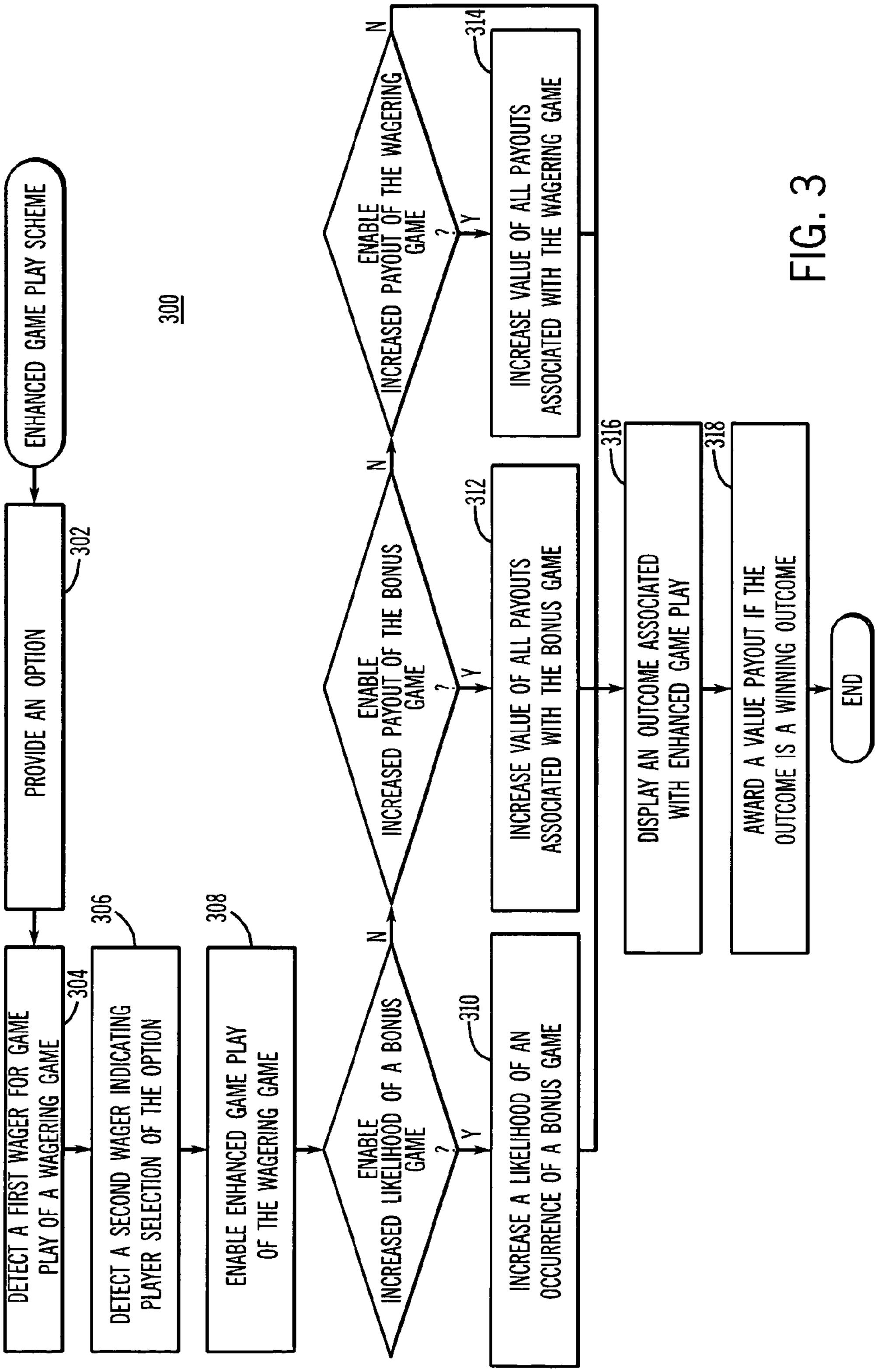
FIG. 3 is a flowchart of an embodiment of an enhanced game play scheme routine that may be performed during game play of the gaming machine of FIG. 1.

FIG. 3 is a flowchart of an embodiment of an enhanced game play scheme routine 300 that may be performed by the controller 200 of the gaming machine 10 or by another controller coupled to the controller 200 (a "coupled controller") during game play. The enhanced game play scheme routine 300 provides one example of game play where, in response to receipt of a second wager to select an option, a player is provided with enhanced game play. Although discussed below in the context of a video slot game for illustrative purposes, it is contemplated that the enhanced game play scheme routine 300 may be executed in conjunction with any number of other wagering base or bonus games provided by gaming machines.

Referring to FIG. 3, the enhanced game play scheme routine 300 begins operation when the controller 200 provides an option for enhanced game play of the wagering game on the gaming machine 10 (step 302). Exercising the option by a player may result in (1) providing more frequent bonus game play, (2) providing a larger value payout average for bonus game play, (3) providing more frequent bonus game play and providing a larger payout for bonus game play, (4) providing a larger value payout average for base game play, (5) providing a guaranteed payout at a predetermined value if a game outcomes yields only non-winning symbol combinations, (6) providing one or more game features, (7) providing a multiplied value payout, and (8) enabling the player to manually adjust the reel symbol array prior to a game play reel spin.

Game play is enabled upon detecting a first wager from a player (step 304). Detection of the first wager includes detecting a value input and detecting a bet. The controller 200 detects the value input when a player deposits one or more of coins, paper currency, card, or a voucher into a value input device of the gaming machine 10. When the controller 200 detects the value input, a number of credits associated are displayed on a credit meter of the main display device 31. After value input detection, the controller 200 enables a pay line selection. If there is only one pay line, the controller 200 enables initiation of base game play. If there is more than one pay line, the controller 200 also enables a bet-per-pay line selection. The bet-per-pay line selection causes an amount per pay line to be bet or wagered with the total wager divided equally between each selected pay line if multiple pay lines are selected. The bet-per-pay line is also displayed to the player via a bet meter on the gaming machine 10. In addition, the controller 200 enables the player to select a maximum bet (via a "Max Bet Spin" button, for example). Thus, the player may chose the maximum bet option causing maximum pay line selection and maximum credits rather than the pay line selection and the bet per pay line selection.

Figure 5:
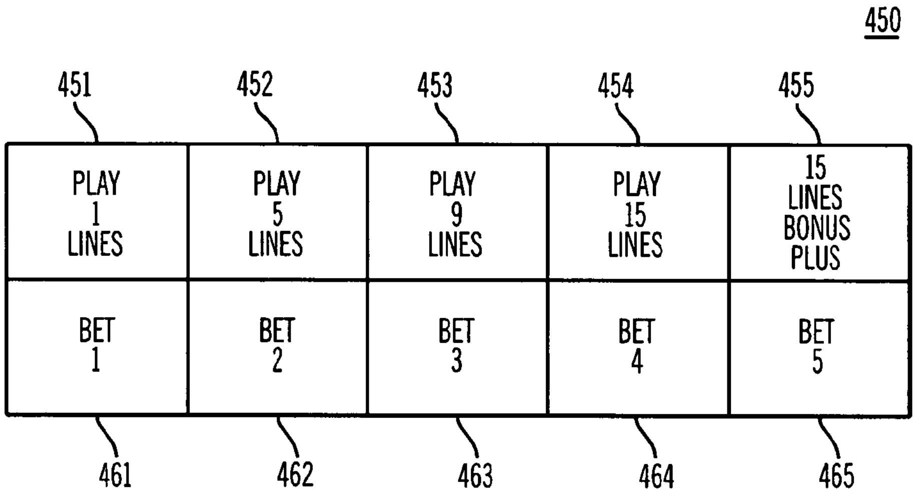
FIG. 5 is an exemplary mechanical button panel for enhanced game play on the gaming machine of FIG. 1.

Pay line selection and bet per pay line selection may be made by the player using a touch screen and/or a mechanical button panel. FIG. 5 is an exemplary mechanical button panel 450 for a slot game play on a slot machine having one or more of the enhanced game play scheme routines described herein. The mechanical button panel 450 includes four buttons 451, 452, 453, and 454 for pay line selection, and five buttons 461, 462, 463, 464, and 465 for a number of credit(s) bet per pay line. Also included is button 455 which when selected, may enable the player selection of the option for enhanced game play. Thus, in a preferred embodiment, providing the option for enhanced game play may include a first wager where the player selects a maximum number of pay lines available for the slot game.

Referring again to FIG. 3, the option for enhanced game play is selected, or exercised, when the player wagers additional credits. Thus, enhanced game play is enabled upon detecting a second wager from the player (step 306). The amount of the second wager may vary depending on the wagering game offered and further depending on the pay lines selected and the bet per pay line. For example, if enhanced game play requires an additional 5 credits per credit bet (per pay line), then enhanced game play for a 15 pay line bet at 5 credits per pay line would require a second wager equivalent to 25 credits. The total amount wagered for the game would therefore be 100 credits; 75 credits for "un-enhanced" game play plus 25 credits to upgrade to enhanced game play.

Upon detecting the second wager, the controller 200 enables enhanced game play of the wagering game (step 308); in the illustrated example, enables a reel spin. The player may spin the reels by depressing a button such as a "Spin Reels" pushbutton provided on the player control panel 44 or by depressing a video display button provided by a touch screen on the gaming machine 10. Alternatively, if the slot game is a mechanical spinning reel slot game utilizing a number of mechanical spinning reels, the player may pull a handle (e.g., an electro-mechanical arm) provided on the gaming machine 10 to initiate the reel spin. In either case, the controller 200, having determined a game outcome based on operation of a pseudo random generator device, stops the reels such that they display a reel symbol array representing the game outcome associated with enhanced game play (step 316). If the reel symbol array includes a winning symbol combination and/or if associated bonus game play yields credits, a value payout (i.e., one or more credits) is awarded to the player (step 318).

The game outcome and/or the value payout may vary, depending on the enhancement enabled upon detecting the second wager.

If the enhancement enabled is an increase in the likelihood of an occurrence of a bonus game, detection of the second wager by the controller 200 may lower the threshold for an occurrence of a bonus game triggering event (step 310). For example, if un-enhanced game play requires that three like symbols (e.g., three Waitress symbols) appear, scattered within the reels symbol array in order to trigger bonus game play, then enhanced game play may require that only two like symbols appear in the reels symbol array in order to trigger bonus game play. An advantage of this type of game enhancement is increased entertainment for the player as the interval between bonus game play is shortened.

If the enhancement enabled is an increase in the value payout average resulting from bonus game play (step 312), detection of the second wager by the controller 200 may cause one of any number of enhanced bonus game schemes having enhanced value payouts to occur. The enhanced value payouts for bonus game play yield an overall increased value payout average to the player as compared with the value payout average associated with un-enhanced game play. For example, if un-enhanced game play yields 10 free spins per bonus game, then enhanced game play, costing 3 additional credits on a nine line slot game, may yield 20 free spins per bonus game.

Figure 6:
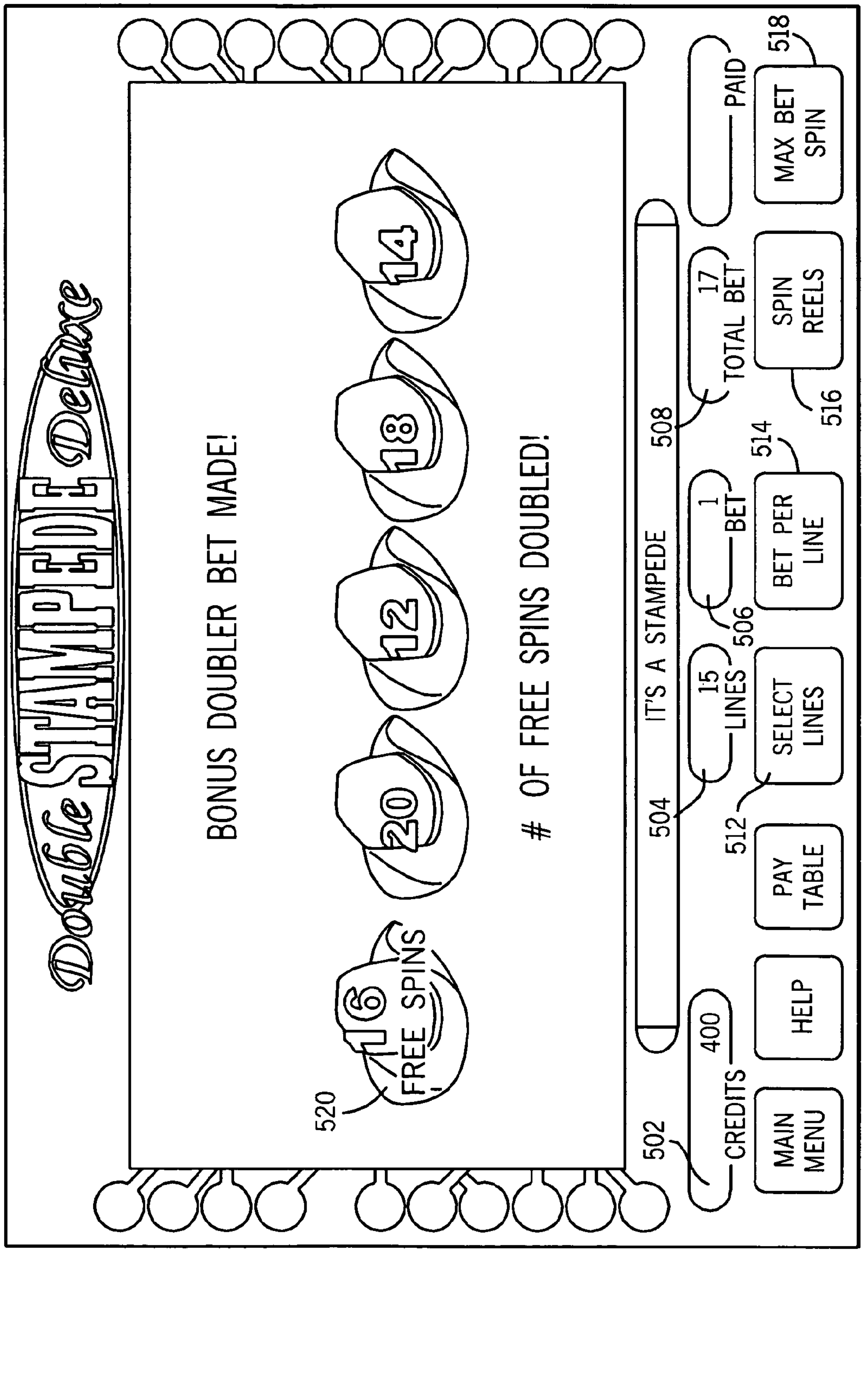
FIG. 6 is an exemplary display screen that may be displayed on the gaming machine of FIG. 1 during performance of the enhanced game play scheme routine of FIG. 3.

FIG. 6 is an exemplary display screen 500 that may be displayed on the gaming machine of FIG. 1 during performance of the enhanced game play scheme routine 300. The exemplary display screen 500 illustrates one example of an enhanced bonus game having an enhanced value payout. Referring to FIG. 6, the exemplary display screen 500 includes a video dashboard having a credit meter 502 for displaying a number of credits available for base game play (e.g., 400 credits), a pay line indicator 504 for displaying the number of pay lines selected (e.g., 15 pay lines), a bet indicator 506 for displaying the number of credits wagered per pay line for an un-enhanced game (e.g., a first wager of 1 credit per pay line). A total bet indicator 508 is also provided for displaying the total credits wagered for the game (e.g., 17 credits); in this case, 15 credits for the first wager, plus 2 credits for the second wager enabling enhanced bonus game play. Also included are a number of player selectable buttons such as a select line button 512, a bet per line button 514, a spin/stop reels button 516, a max bet spin button 518, etc. Although illustrated as virtual touch screen buttons, some of the player selectable buttons may also be configured into the mechanical button panel described in connection with FIG. 4.

In the illustrated example, the player selects the option for enhanced game play by placing the second wager of 2 additional credits. Enhanced game play causes doubling of the number of free spins awarded during bonus game play. Thus, the player, having placed the second wager of two credits, having won a bonus game, and having selected a first symbol 520 from among five symbols (i.e., five cowboy hats) during bonus game play, is awarded 16 free spins rather than 8 spins, thereby yielding an overall increased value payout average to the player as compared with the value payout average associated with un-enhanced game play.

In another example, if un-enhanced game play yields an un-enhanced value payout amount associated with a bonus game outcome, then enhanced game play may yield double, triple, etc., the un-enhanced value payout amount associated with the same bonus game outcome. Returning to the free spin example, for a second wager of 3 credits on a nine pay line slot game, enhanced game play may yield a bonus game having 10 free spins with double, triple, etc., value pay outs. In yet a further example, if un-enhanced game play allows a player during bonus game play to select/reveal items having a credit value until a bonus game-ending item (e.g., a terminator, a party pooper) is selected/revealed, enhanced game play may allow the player during bonus game play to select/reveal items until two bonus game-ending items are selected/revealed (e.g., enhanced game play may include one "terminator saver"). In all of the above examples, additional credits, on average, are paid out to the player(s) during enhanced game play of a bonus game. Although too numerous to mention, other examples of an enhanced bonus game having increased value payouts for bonus game play, are contemplated.

If the enhancement enabled is an increase in the likelihood of an occurrence of a bonus game (step 310) and increase in the value payout average resulting from bonus game play (step 312), detection of the second wager by the controller 200 may cause one of any number of bonus game schemes to occur which result in increased bonus game occurrences, increased value payout averages per bonus game, or both. For example, if un-enhanced game play of a nine pay line game (e.g., "X Marks The Spot") having three separate bonus games where the first bonus game is triggered by three like reel symbols in a reel symbol array (e.g., Treasure Chest Scatter), the second bonus game yields five free spins (e.g., Free Spin Bonus), and the third bonus game yields three value symbols (e.g., Second Screen Bonus), then enhanced game play costing 6 additional credits may enable (a) the first bonus game to be triggered by two like reel symbols, (b) the second bonus game to yield ten free spins, and (c) the third bonus game to yield five value symbols. In one embodiment, the six additional credits provided via the second wager may be allocated evenly (i.e., 2 credits per bonus game) between the three bonus games.

If the enhancement enabled is an increase in the value payout average resulting from base game play (step 314), detection of the second wager by the controller 200 may cause one of any number of base game schemes having enhanced value payouts to occur. The enhanced value payouts for base game play yield an overall increased value payout average to the player as compared with the value payout average associated with un-enhanced game play. In other words, detection of the second wager by the controller 200 may cause an increase to all or part of the value payouts associated with winning symbol combinations displayed on a pay table of the gaming machine 10. For example, if un-enhanced game play of a five reel game has a value payout of 200 credits for five like symbols displayed in a symbol array, then enhanced game play costing 5 additional credits per game per credit bet (per pay line), may enable a value payout of 500 credits for the same five like symbols. Such an enhancement scheme maximizes the volatility of game play for those players wishing to exercise the option by placing the second wager. In another example, if un-enhanced game play of a five reel game has no value payout for two like symbols displayed in a symbol array, then enhanced game play costing 5 additional credits per game per credit bet (per pay line), may enable a 2 credit payout for all two like symbols displayed in the symbol array. Such an enhancement scheme allows for lower volatility game play for a player wishing to exercise the option by placing the second wager.

Another example of a base game scheme having an enhanced value payout includes providing a guaranteed value payout to the player at the conclusion of every game. Therefore, if the enhancement enabled is providing a guaranteed payout at a predetermined value if a game outcomes is a non-winning outcome (step 312), detection of the second wager by the controller 200 may cause one of any number of game schemes to occur where a guaranteed value payout occurs. For example, if un-enhanced game play of a nine pay line slot game only yields a value payout for winning symbol combinations appearing in a pay table of the gaming machine 10, then enhanced game play, costing one additional credit for every nine pay line slot game, yields a 10 credit value payout if the game outcome yields only non-winning symbol combinations.

If the enhancement enabled is activating one or more game feature(s), detection of the second wager by the controller 200 may cause one of any number of game features to be included in the game. The feature may, for example, be a special function indicator that indicates a random or predetermined position(s) on the reels. A symbol landing in the indicated position may be considered a wild symbol or a scatter symbol for that spin of the reels. The feature may be an expanding wild symbol such that if the player places the second wager, a regular wild symbol expands to occupy the entire reel. The feature may be to eliminate or override one or more less-favorable outcomes in a bonus game. The less-favorable outcome may, for example, be a low credit award or a stopper (e.g., a terminator or party pooper) symbol in a bonus round where the player makes selections until selecting an item that reveals the stopper symbol.

As mentioned above, enhanced game play may include providing a larger value payout for base game play if, after a partial game outcome is displayed, the player selects the option by placing the second wager. The player may wish to select such an option when, for example, a partial reel symbol array indicates that a winning outcome is more likely than not.

Figure 4:
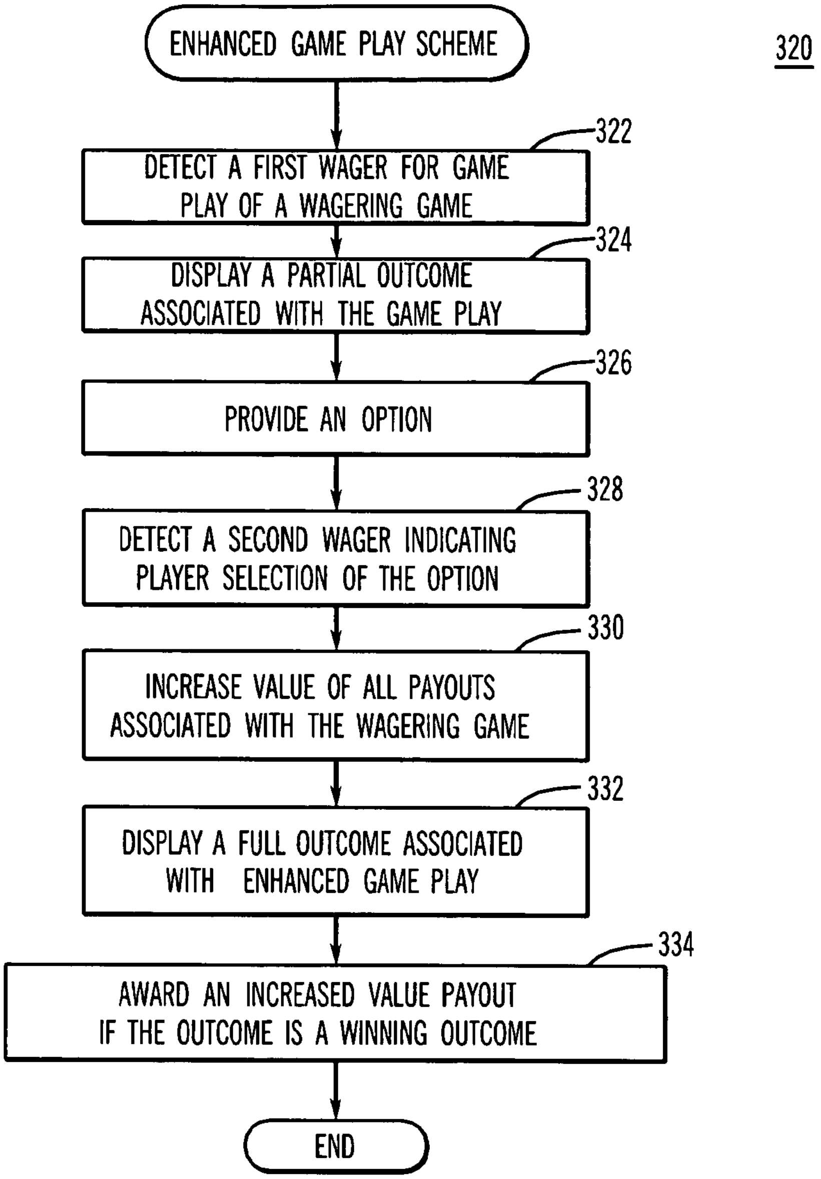
FIG. 4 is a flowchart of another embodiment of an enhanced game play scheme routine that may be performed during game play of the gaming machine of FIG. 1.

FIG. 4 is a flowchart of another embodiment 320 of an enhanced game play scheme routine that may be performed by the controller 200 during game play of the gaming machine 10 or by a coupled controller during game play. The enhanced game play scheme routine 320 provides one example of game play where, in response to receipt of a second wager to select an option, a player is provided with enhanced game play after a partial game outcome is displayed.

Referring to FIG. 4, the enhanced game play scheme routine 320 begins operation when the controller 200 detects a first wager for game play of the wagering game (step 322). Next, the controller 200 enables game play and then displays a partial wagering game outcome (step 324); in this case, enables a reel spin and displays a partial reel symbol array provided by at least two stopped reels of the total number of reels. The controller 200 then provides an option to the player for enhanced game play (step 326) where enhanced game play includes increasing a value of some or all of the value payouts associated with the winning base game outcomes (e.g., winning symbol combinations).

In response to receiving a second wager indicating player selection of the option (step 328), the controller 200 displays a full outcome associated with enhanced game play (step 332); in this case, stops the remaining spinning reels to display a full reel symbol array. If the full outcome associated with enhanced base game play includes a winning outcome, a value payout is awarded to the player (step 334) where the value payout reflects the increase of some or all of the value payouts associated with the winning base game outcomes.

In yet another embodiment of an enhanced game play scheme routine, the controller 200 provides an option to the player to "purchase" (for a second wager amount) a modified value payout scheme after displaying a partial game outcome. For example, based on a partial game outcome of a slot game where the first and second left-most reels have been stopped, the player may wish to purchase an option for a right-to-left line pay. The player may wish to select such the option when the partial game outcome reel symbol array includes a low occurring and high paying symbol, when it appears that a traditional left-to-right line pay is unlikely or when it appears that a right-to-left line pay is likely.

FIGS. 7-12 are a series of exemplary display screens 600 that may be displayed during performance of yet another embodiment of an enhanced game play scheme routine 650 during game play of the gaming machine of FIG. 1. The exemplary display screens 600 illustrate one example of the enhanced game play scheme routine 650 where a reel symbol (e.g., a Super Wild symbol) is able to be repositioned in a reel symbol array if it is activated and if repositioning would yield a higher value payout to the player.

Figure 7:
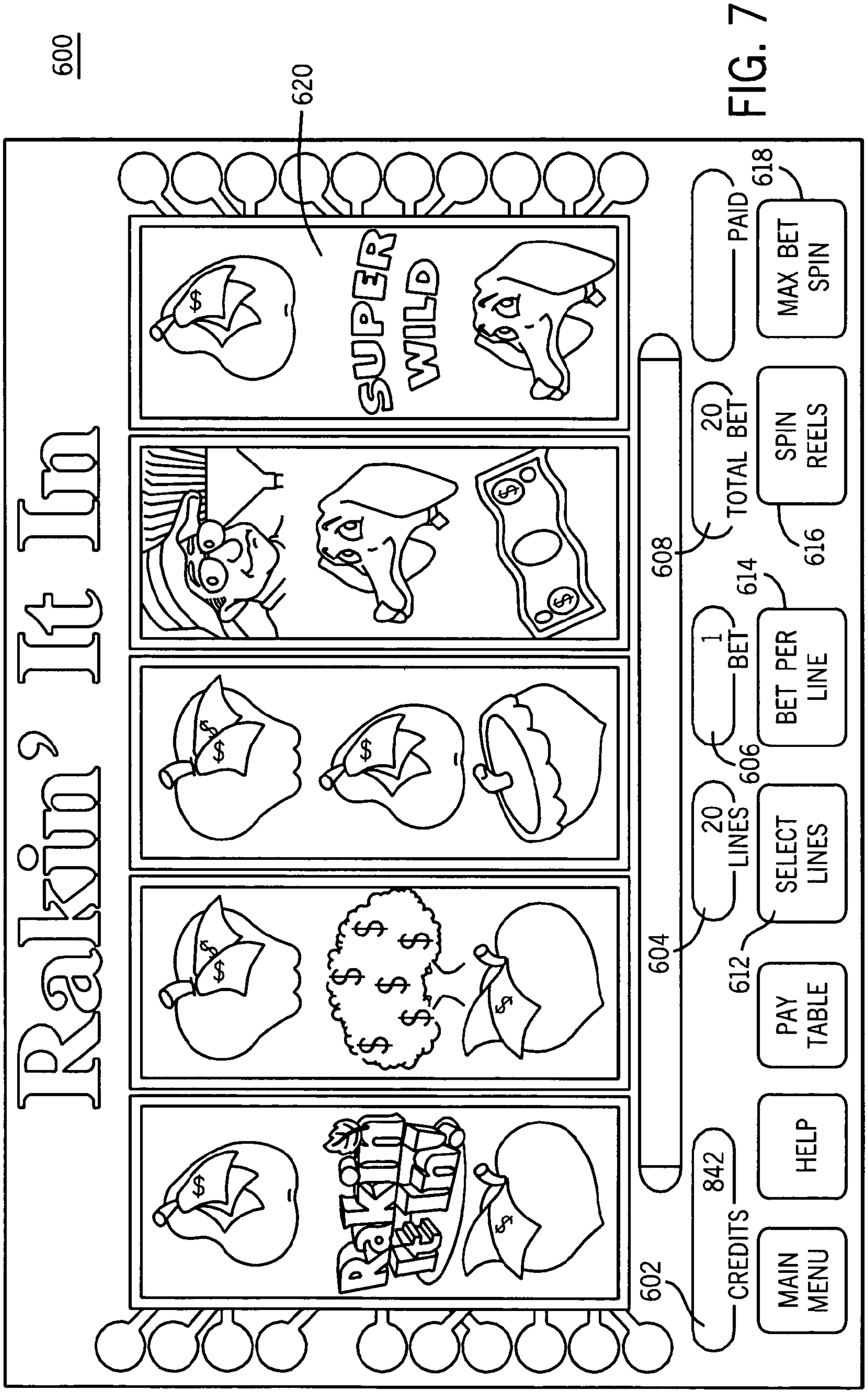
FIGS. 7-12 are a series of exemplary display screens that may be displayed during performance of yet another embodiment of an enhanced game play scheme routine performed during game play of the gaming machine of FIG. 1.

Referring to FIG. 7, the exemplary display screen 600 includes a video dashboard having a credit meter 602 displaying 842 credits, a pay line indicator 604 displaying 20 pay lines, a bet indicator 606 displaying a first wager of 1 credit per pay line, a total bet indicator 608 displaying total credits wagered of 20 credits for a first wager for game play. In the illustrated example of FIG. 7, the 842 credits displayed on the credit meter 602 reflect a deduction of 20 credits prior to the reel spin. As will be appreciated by those of ordinary skill in the art, in some slot game designs, the deduction of wagered credits may not be reflected on the credit meter 602 until after the reel spin.

Also included on the video dashboard of the exemplary display screen 600 are a number of player selectable buttons such as a select line button 612, a bet per line button 614, a spin/stop reels button 616, a max bet spin button 618, etc. Although illustrated as virtual touch screen buttons, the some of the player selectable buttons may also be configured within the mechanical button panel described in connection with FIG. 4.

In the illustrated example of FIG. 7, one of the reel symbols on one of the reels (i.e., on reel five) is designated as a super wild reel symbol 620 (e.g., a Super Wild symbol) that is able to be repositioned in an outcome reel symbol array if the supper wild symbol is activated and if repositioning would yield a higher value payout to the player. When the controller 200 detects a first wager of a first amount of credits from a player to play the slot game, the controller 200 provides an option to activate the super wild symbol 620.

The option is preferably provided only when the first wager includes player selection of a maximum number of pay lines available for the slot game. For example, for a reel symbol array having fifteen reel symbols and up to twenty player pay lines, the option is preferably provided only when the first wager includes player selection of twenty pay lines. It is contemplated that in other slot game designs, the option may be offered when less pay lines are selected, when the first wager includes a maximum number of credits per pay line bet, etc.

Figure 8:
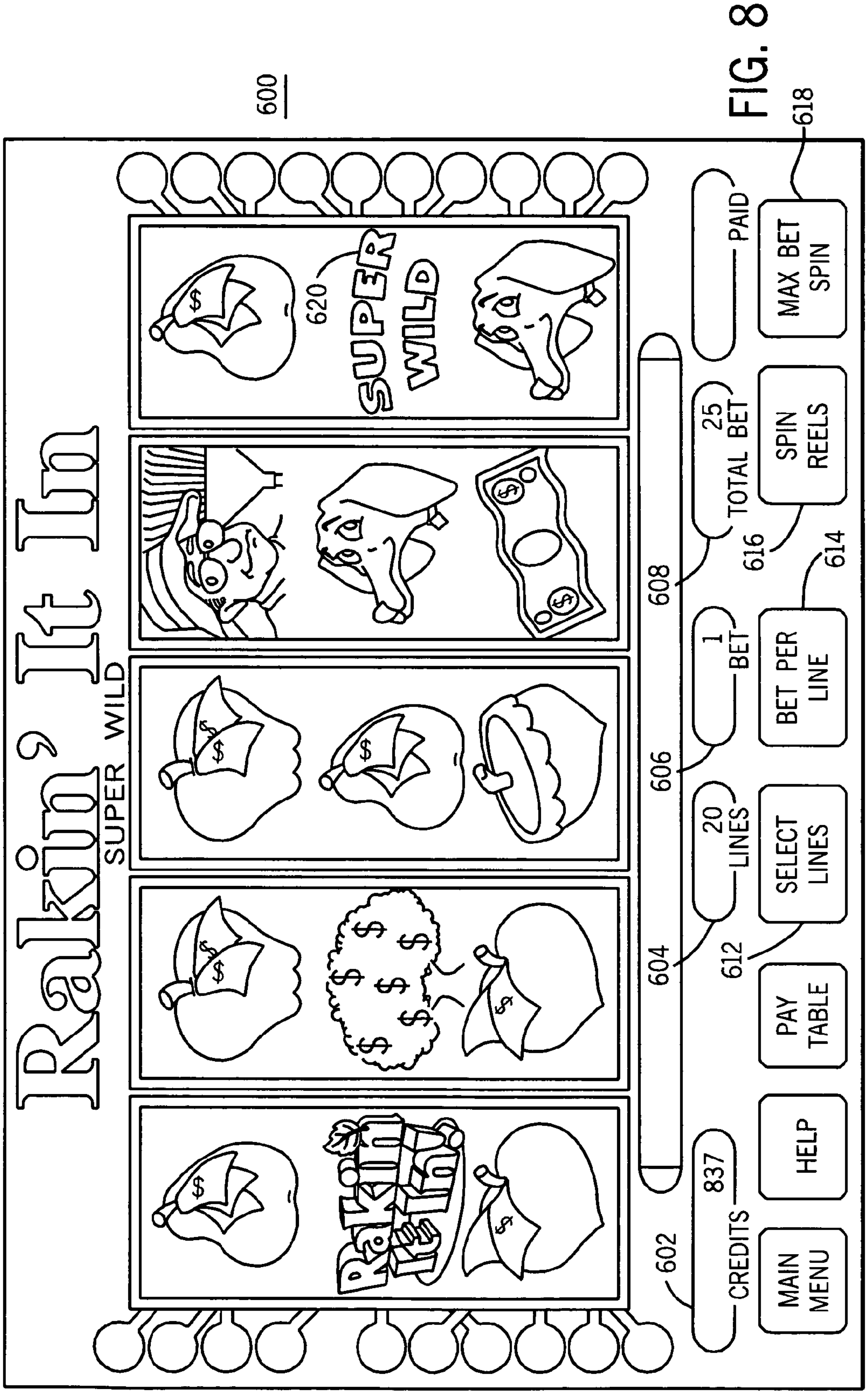
Figure 9:
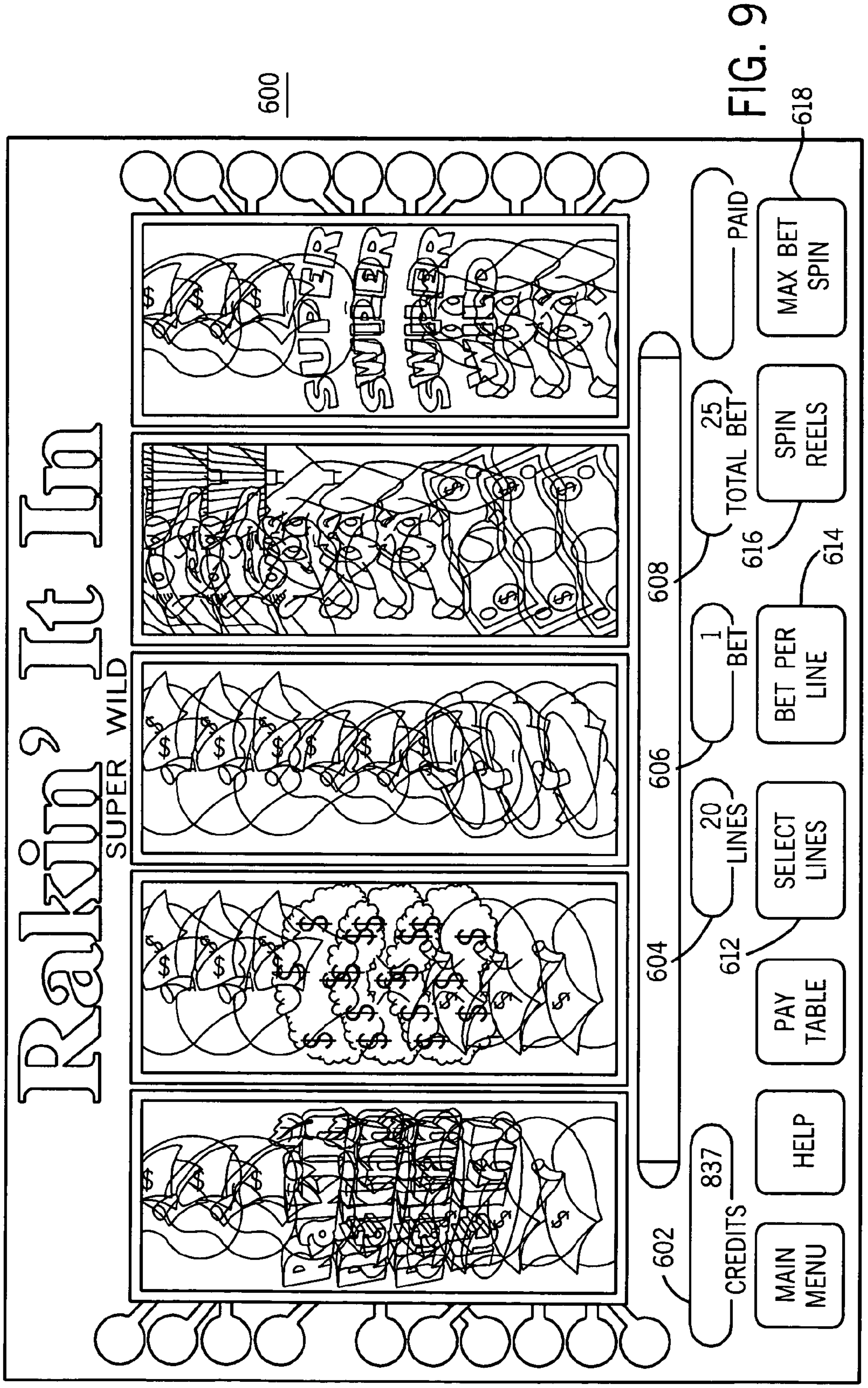
Figure 10:
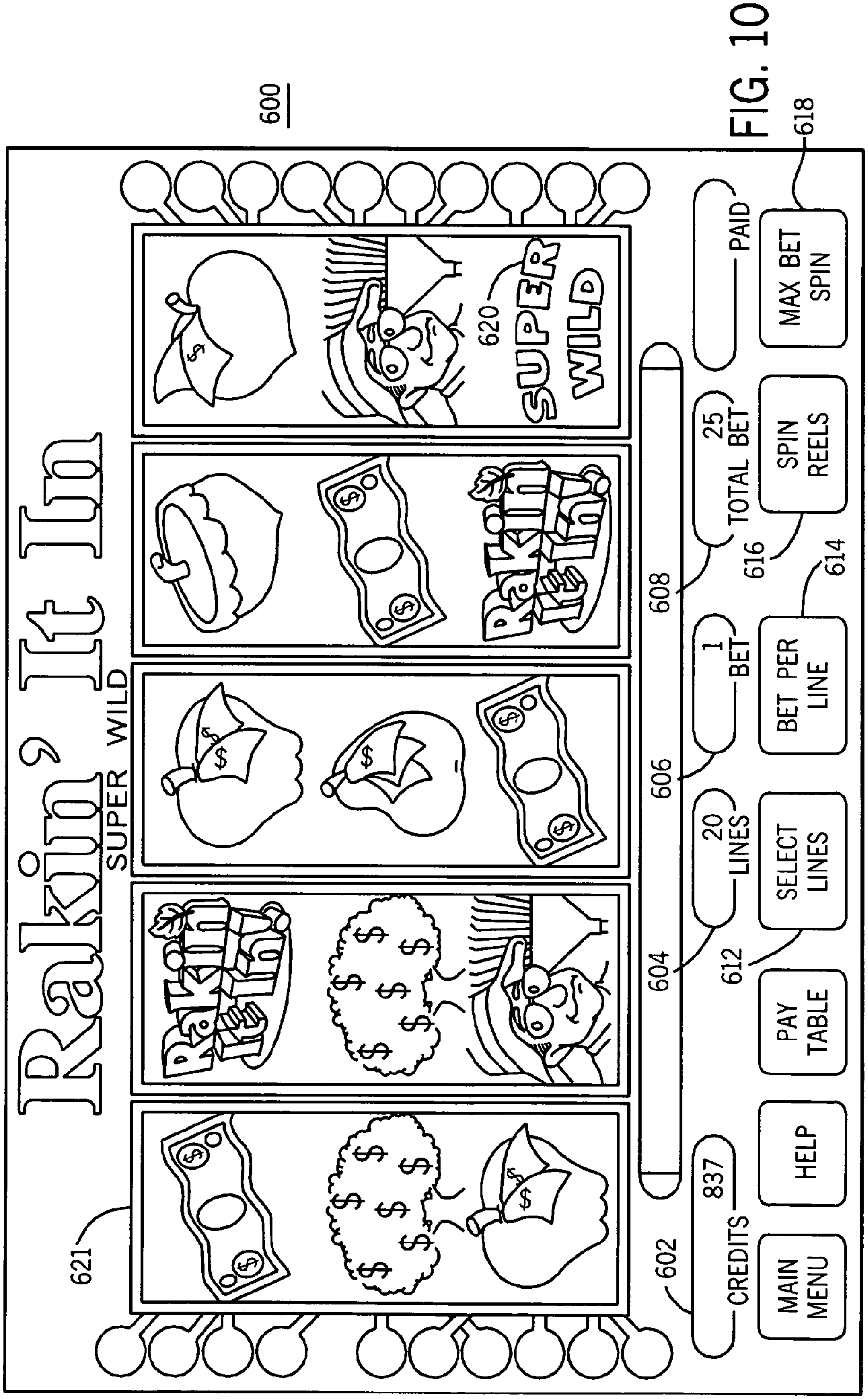
Figure 11:
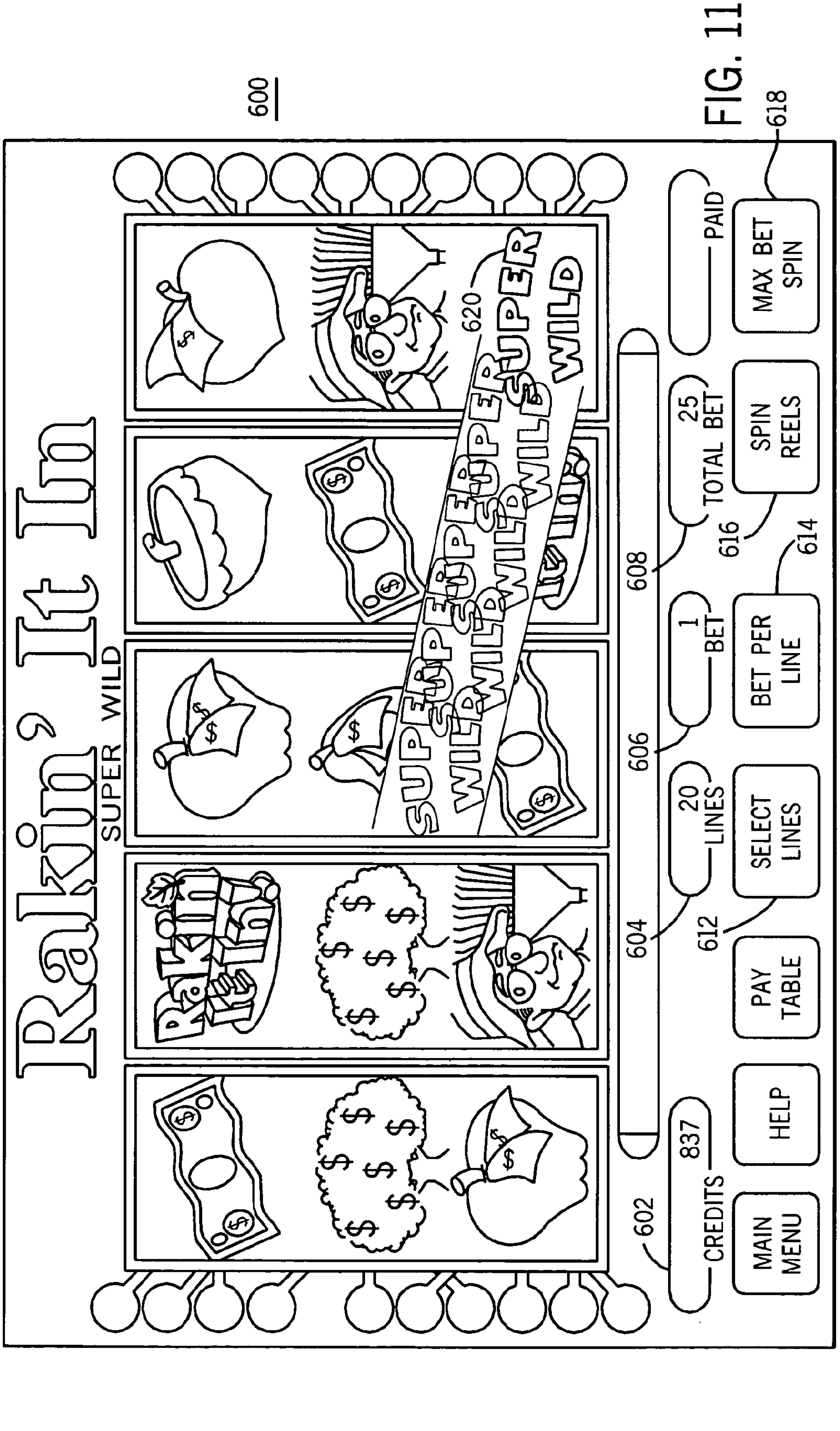
Figure 12:
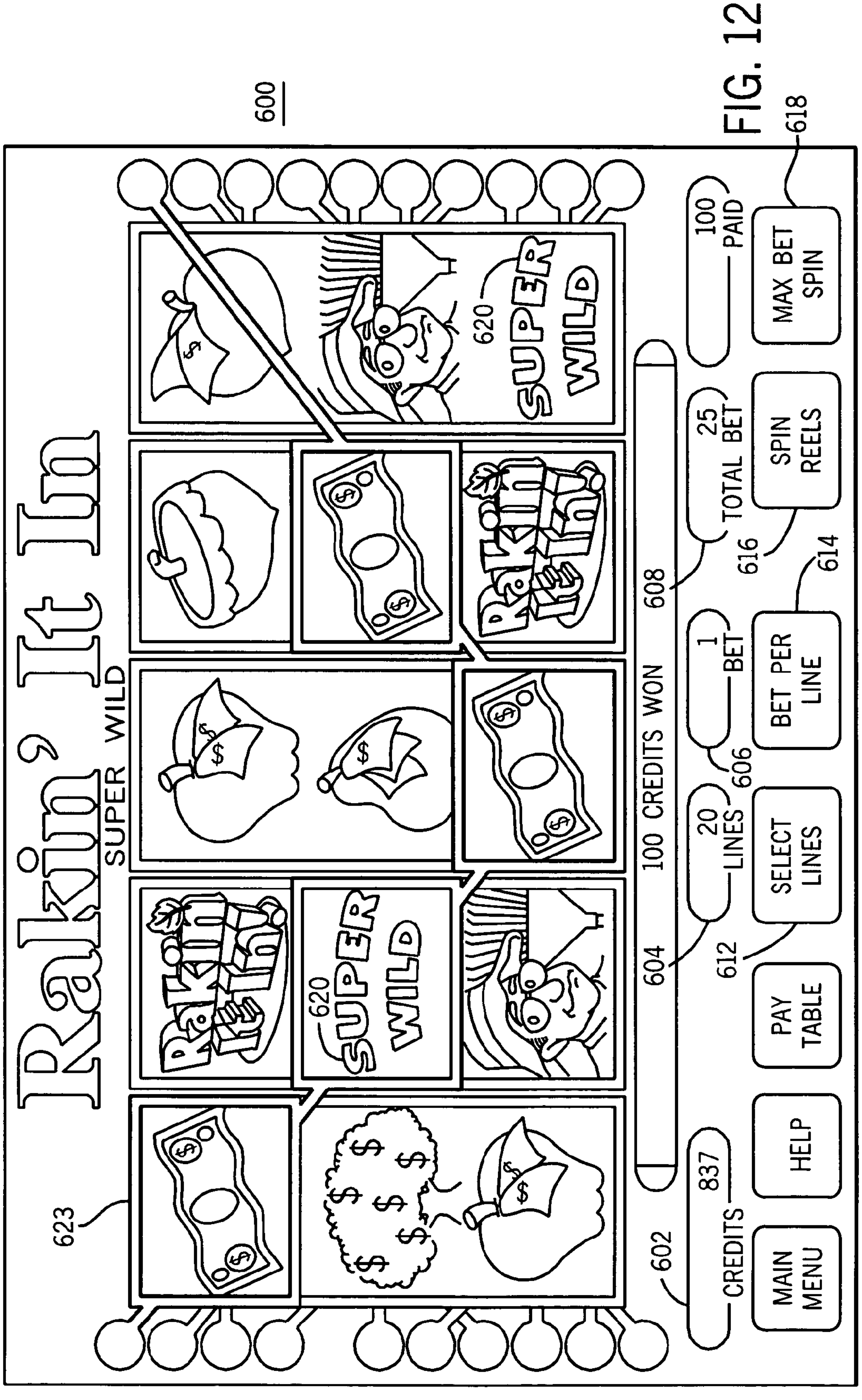

Referring to FIG. 8, upon receiving a second wager (i.e., a second amount of credits, in this case 5 credits) indicating player selection of the option, the total bet indicator 608 reflects the second wager by increasing from 20 to 25 credits, the super wild symbol 620 is activated and enhanced slot game play is enabled. The second credit amount is preferably directly proportional to a number of credits bet per selected pay line(s). Activating may also include changing a color of the super wild reel symbol to notify the player of the activated state. Next, the reels are rotated (see, FIG. 9) and stopped to display a first reel symbol array 621. If the super wild symbol 620 appears in the first reel symbol array 621 (see, FIG. 10), the super wild symbol 620 is repositioned (see, FIG. 11) to display a second reel symbol array 623 (see, FIG. 12) if the second reel symbol array has a higher value payout than the first reel symbol array. In the illustrated example of FIG. 12, the repositioned super wild symbol completes a four money-symbol pay line resulting in a 100 credit value output.

Because of the repositioning of the super wild symbol 620, a probability of an occurrence of a winning outcome is higher in the second reel symbol array than in the first symbol array. Further the super wild symbol is repositioned by the controller 200 to maximize the value payout to the player.

FIGS. 13-18 are a series of exemplary display screens 700 that may be displayed during performance of a further embodiment of an enhanced game play scheme routine 750 during game play of the gaming machine of FIG. 1. The exemplary display screens 700 illustrate one example of the enhanced game play scheme routine 750 where a reel displaying a first extra symbol is able to be "nudged", or undergoes an additional slight movement, to reposition the first extra symbol in a reel symbol array if the additional movement would yield a higher value payout to the player.

Figure 13:
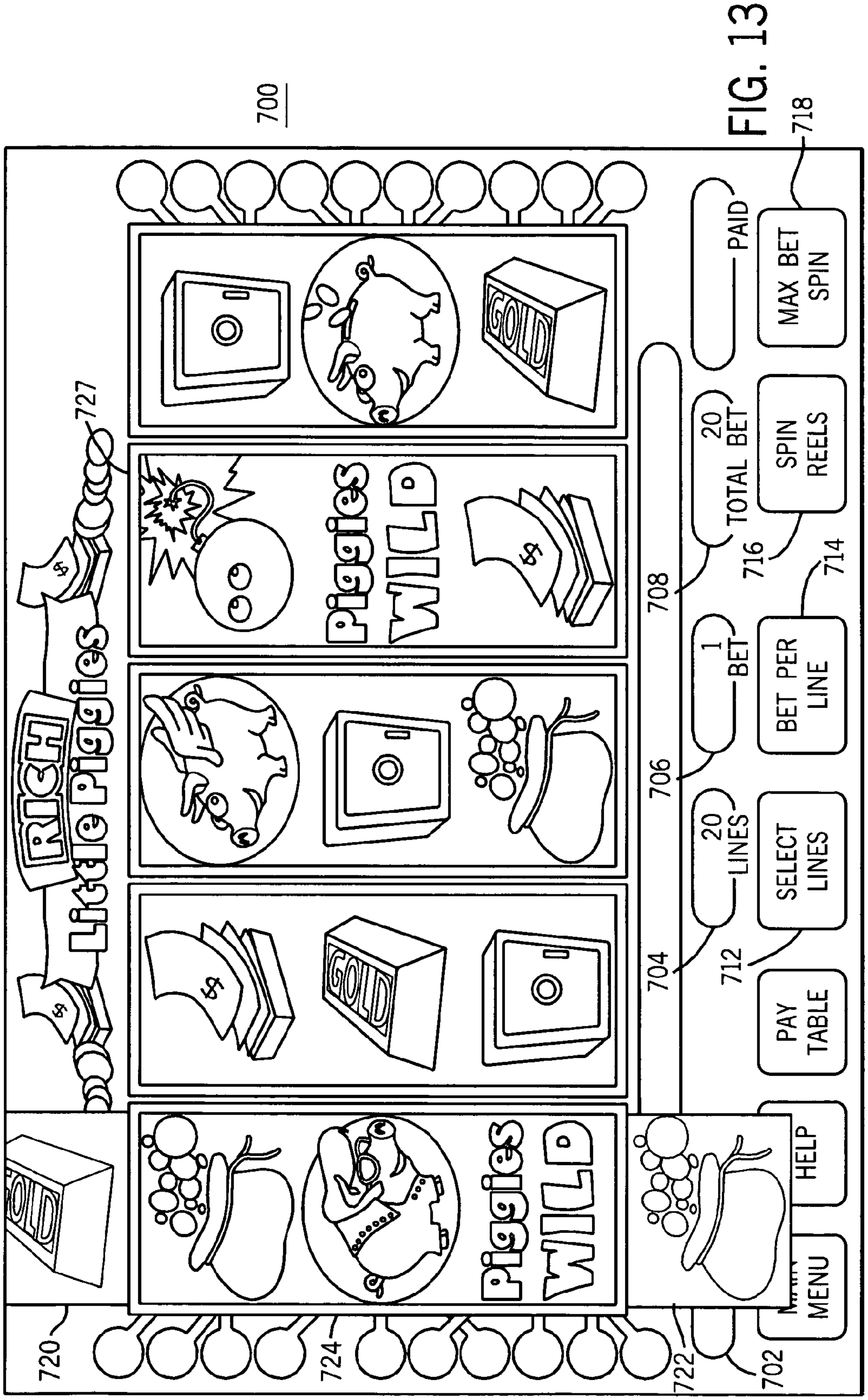
FIGS. 13-18 are a series of exemplary display screens that may be displayed during performance of a further embodiment of an enhanced game play scheme routine during game play of the gaming machine of FIG. 1.

Referring to FIG. 13, the exemplary display screen 700 includes a video dashboard having a credit meter 702, a pay line indicator 704 displaying 20 pay lines, a bet indicator 706 displaying a first wager of 1 credit per pay line, a total bet indicator 708 displaying total credits wagered of 20 credits. Also included are a number of player selectable buttons such as a select line button 712, a bet per line button 714, a spin/stop reels button 716, a max bet spin button 718, etc. Although illustrated as virtual touch screen buttons, some of the player selectable buttons may also be configured within the mechanical button panel described in connection with FIG. 4.

In the illustrated example of FIG. 13, a first extra reel symbol 720 (i.e., a gold bar) and a second extra reel symbol 722 (i.e., a money bag) are displayed above and below the first reel 724 of a first symbol array 727 of fifteen reel symbols. When the controller 200 receives a first wager of a first amount of credits from a player to play the slot game, the controller 200 provides an option to activate a possibility of movement of the first reel 724 to reposition either the first extra reel symbol 720 or the second extra reel symbol 722 after the reels spin and stop.

The option is preferably provided only when the first wager includes player selection of a maximum number of pay lines available for the slot game. It is contemplated that the option may be offered however, when less pay lines are selected, when the first wager includes a maximum number of credits per pay line bet, etc.

Figure 14:
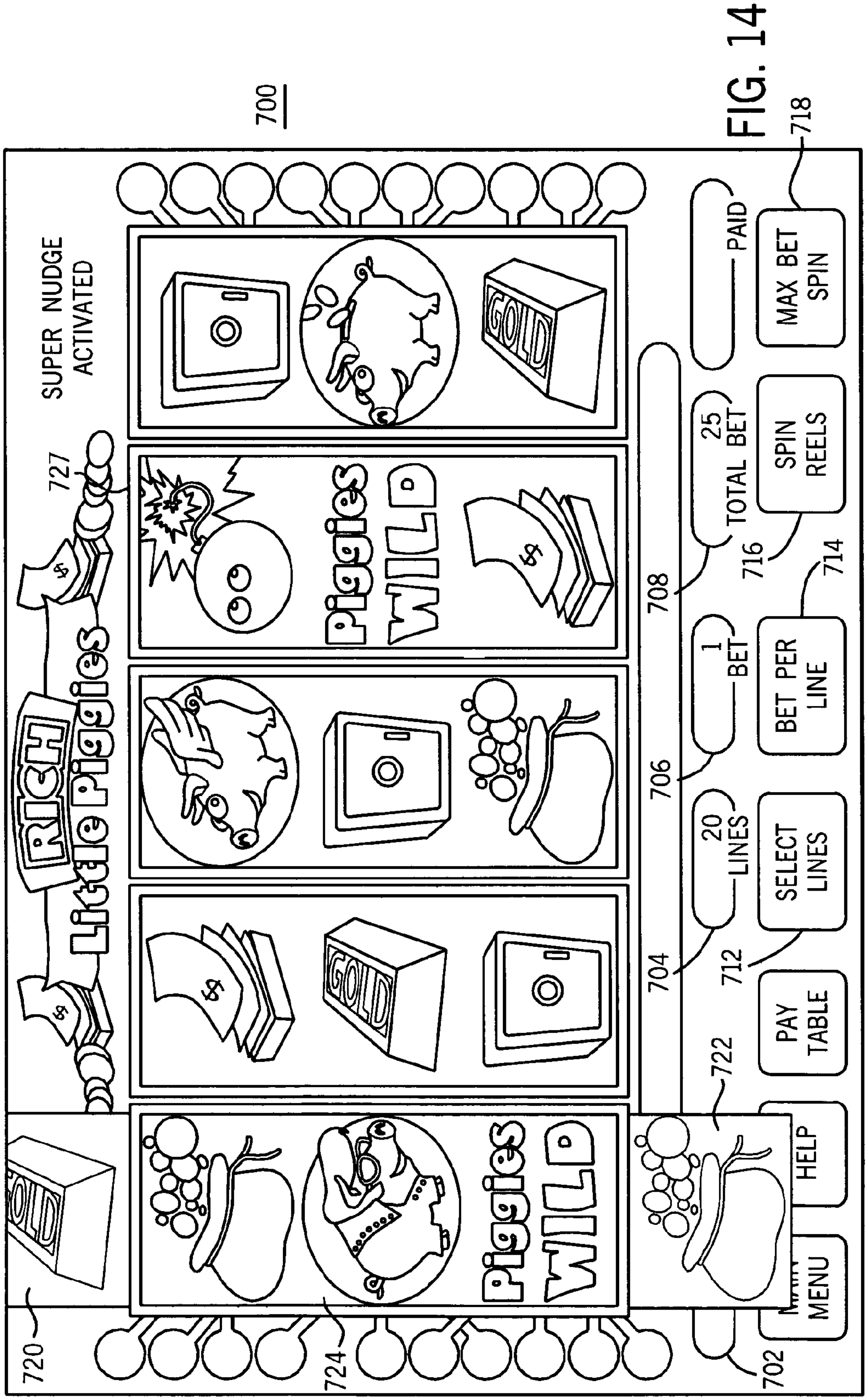
Figure 15:
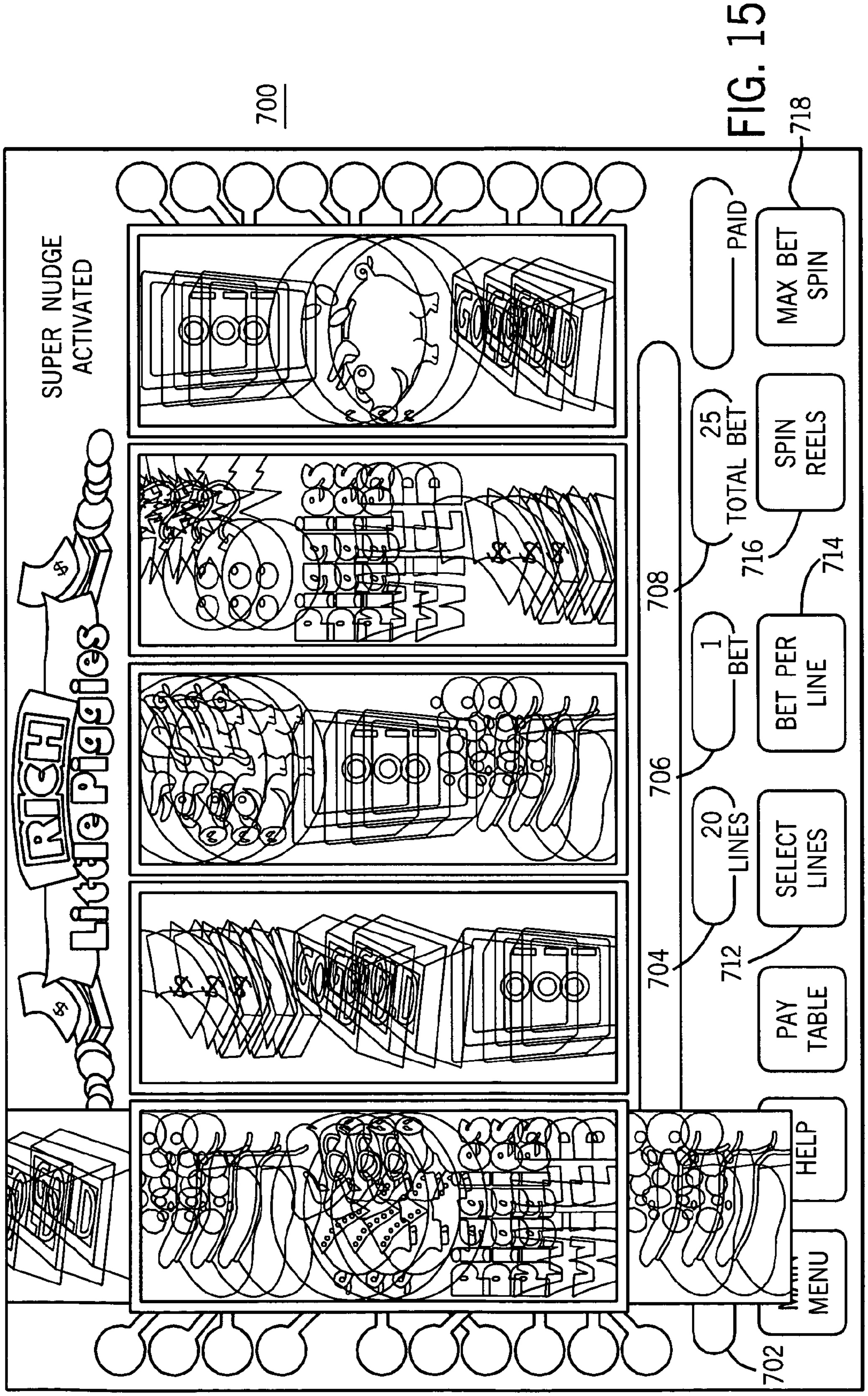
Figure 16:
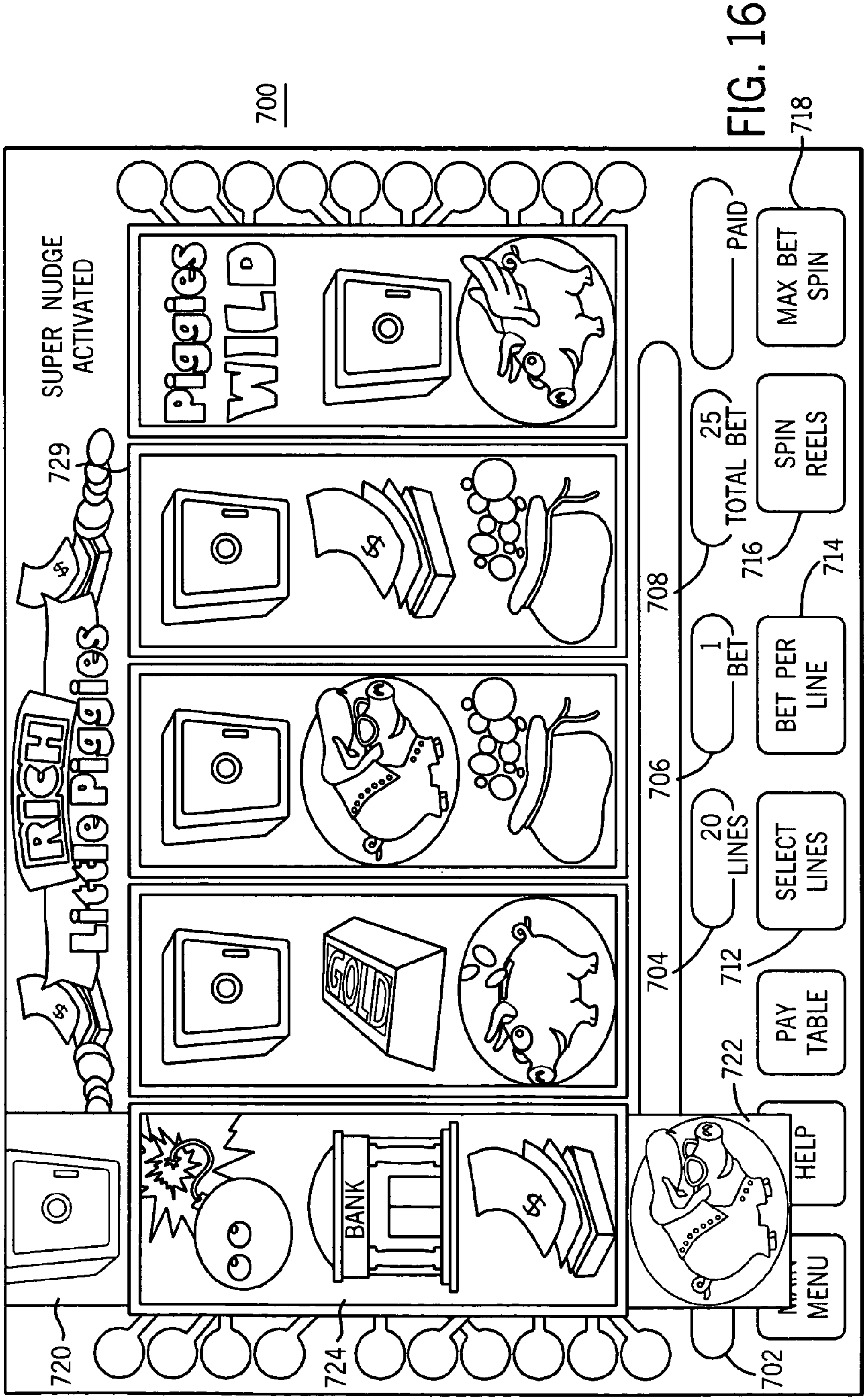
Figure 17:
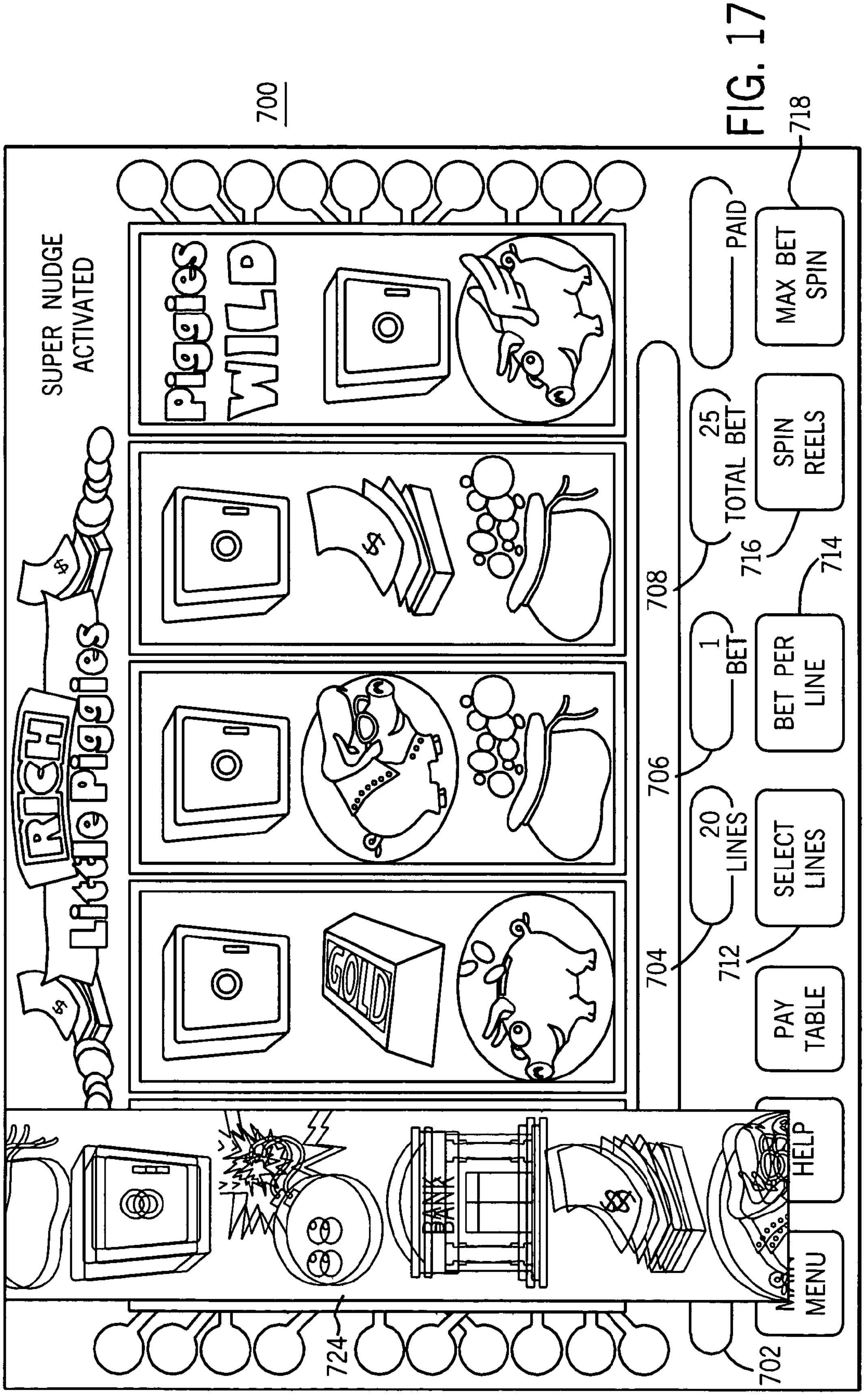
Figure 18:
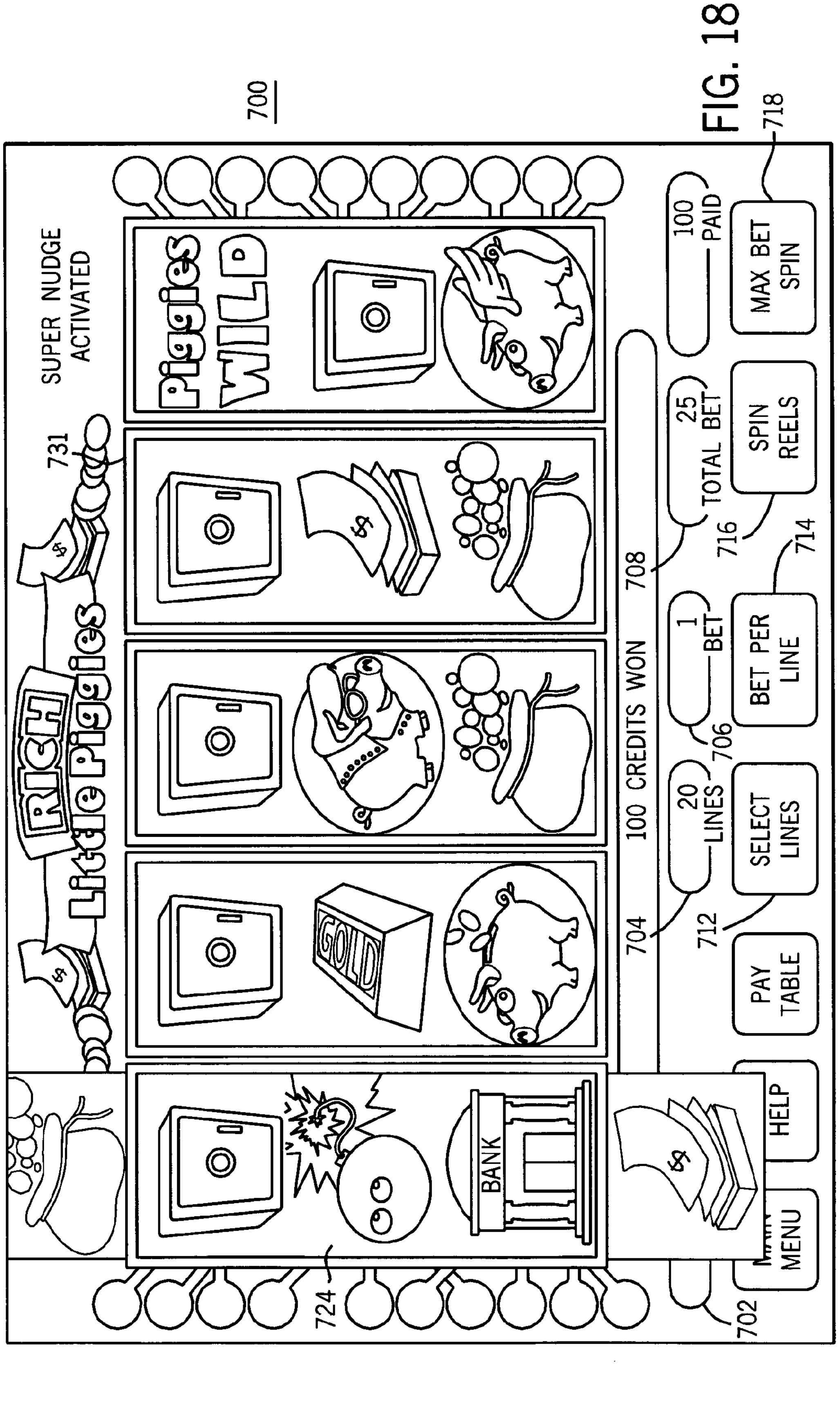

Referring to FIG. 14, upon receiving a second wager (i.e., a second amount of credits) indicating player selection of the option, the total bet indicator 708 reflects the second wager by increasing from 20 to 25 credits, the possibility of movement of the first reel 724 to reposition either the first extra reel symbol 720 or the second extra reel symbol 722 is activated and therefore enhanced slot game play is enabled. The second credit amount is preferably directly proportional to a number of credits bet per selected pay line(s). Activating may also include changing a color of the first and second extra reel symbol 720, 722 (see, FIG. 14) and/or displaying the words "SUPER NUDGE ACTIVATED" to notify the player of the activated state. Next, the reels are rotated (see, FIG. 15) and stopped to display a second reel symbol array 729 (see, FIG. 16). The first extra reel symbol 720 (i.e., a bank safe) and the second extra reels symbol 722 (i.e., a piggy bank) are also rotated and stopped (see, FIG. 16). If the addition movement of the first reel 724 to reposition the first extra symbol 720 into a third reel symbol array results in a higher value payout than the second symbol array (see, FIG. 17), then the first extra reel will nudge downward by one reel position to form the third symbol array 731. Similarly, if the addition movement of the first reel 724 to reposition the second extra symbol 722 into a third reel symbol array results in a higher value payout than the second symbol array, then the first extra reel will nudge upward by one reel position to form the third array 731. In the illustrated example of FIG. 18, repositioning the first extra symbol 720, a bank safe, into the third reel symbol array creates a five bank safe combination yielding in a higher value payout than the second symbol array.

Because of the possibility of repositioning either the first or second extra reel symbol, a probability of an occurrence of a winning outcome is higher in the third reel symbol array than in the second symbol array. Further, either the first or second extra reel symbol is repositioned via the additional movement of the first reel 724 by the controller 200 to maximize the value payout to the player.

FIGS. 19-22 are a series of exemplary display screens 800 that may be displayed during performance of yet a further embodiment of an enhanced game play scheme routine 850 during game play of the gaming machine of FIG. 1. The exemplary display screens 800 illustrate one example of the enhanced game play scheme routine 850 where an extra reel symbol is used to generate a new pay line having a winning symbol combination and yielding a value payout to the player.

Figure 19:
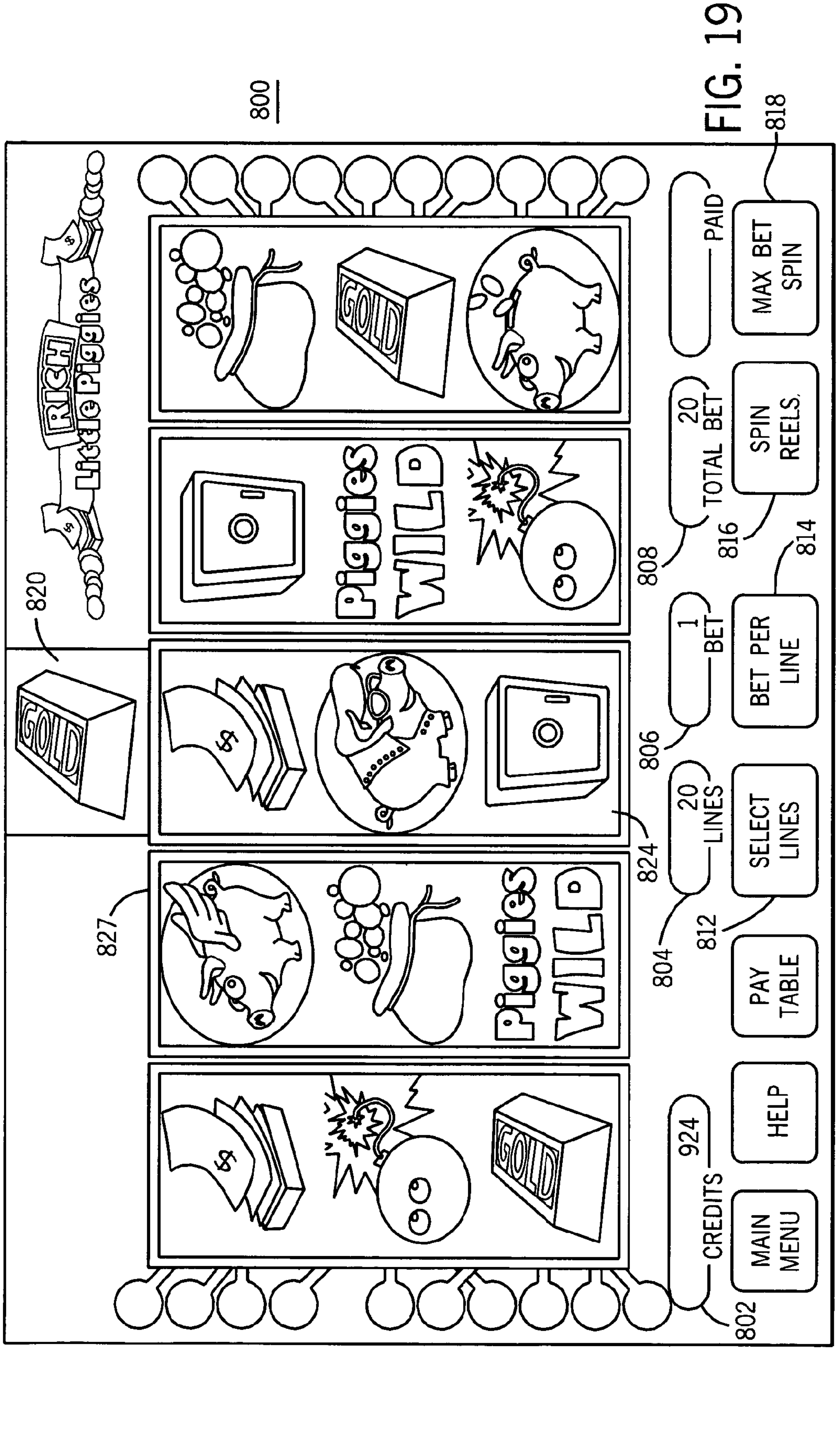
FIGS. 19-22 are a series of exemplary display screens that may be displayed during performance of yet a further embodiment of an enhanced game play scheme routine during game play of the gaming machine of FIG. 1.

Referring to FIG. 19, the exemplary display screen 800 includes a video dashboard having a credit meter 802 displaying 924 credits, a pay line indicator 804 displaying 20 pay lines, a bet indicator 806 displaying a first wager of 1 credit per pay line, a total bet indicator 808 displaying total credits wagered of 20 credits. Also included are a number of player selectable buttons such as a select line button 812, a bet per line button 814, a spin/stop reels button 816, a max bet spin button 818, etc. Although illustrated as virtual touch screen buttons, some of the player selectable buttons may also be configured within the mechanical button panel described in connection with FIG. 4.

In the illustrated example of FIG. 19, an extra reel symbol 820 (i.e., gold bar) is displayed above a first symbol array 827 of fifteen reel symbols. The extra reel symbol 820 is preferably displayed above the third reel 824 although it may be displayed above or below any of the reels. When the controller 200 receives a first wager of a first amount of credits from a player to play the slot game, the controller 200 provides an option to activate a possibility of generating an extra pay line that includes the extra reel symbol 820.

The option is preferably provided only when the first wager includes player selection of a maximum number of pay lines available for the slot game. It is contemplated that the option may be offered however, when less pay lines are selected, when the first wager includes a maximum number of credits per pay line bet, etc.

Figure 20:
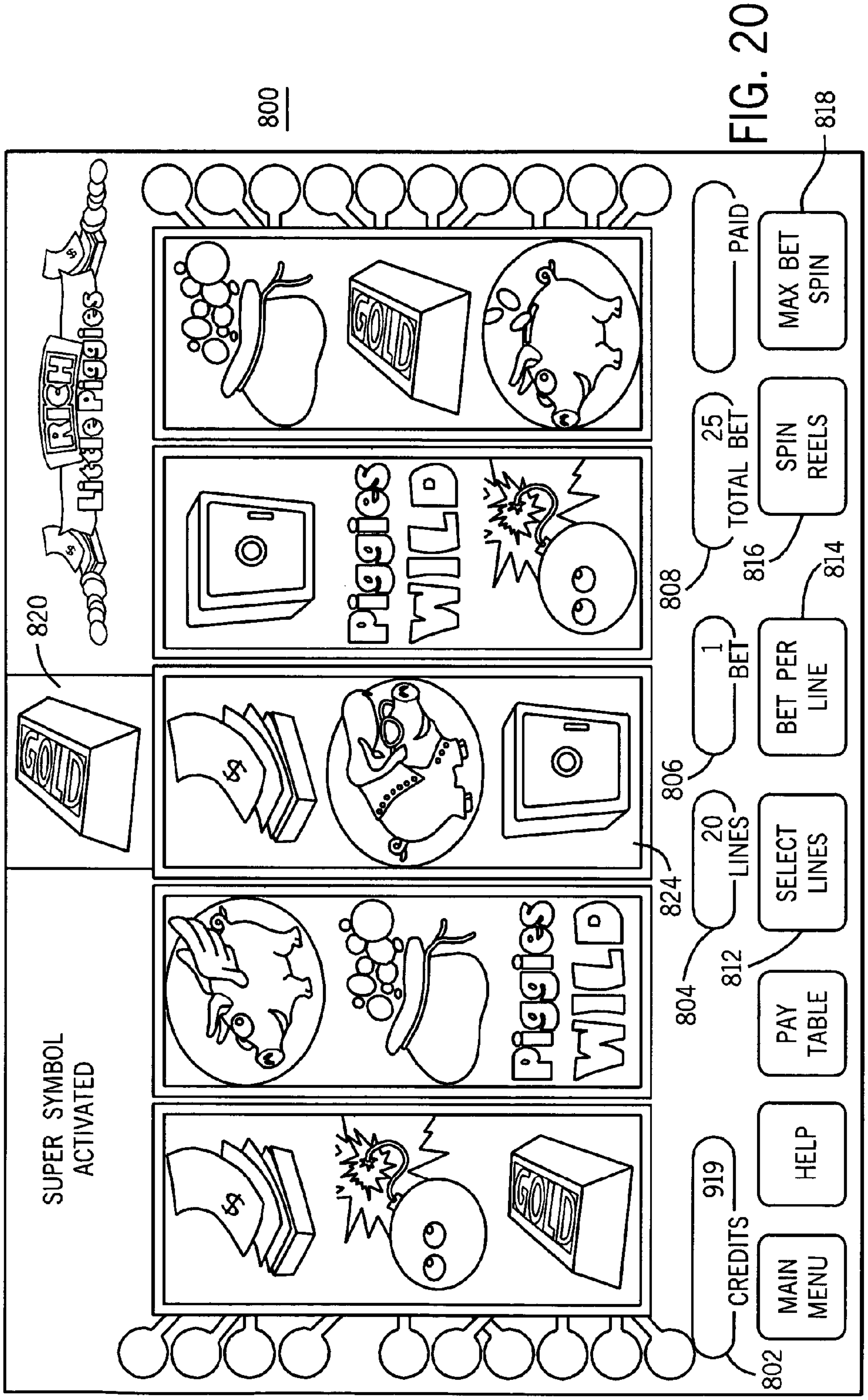
Figure 21:
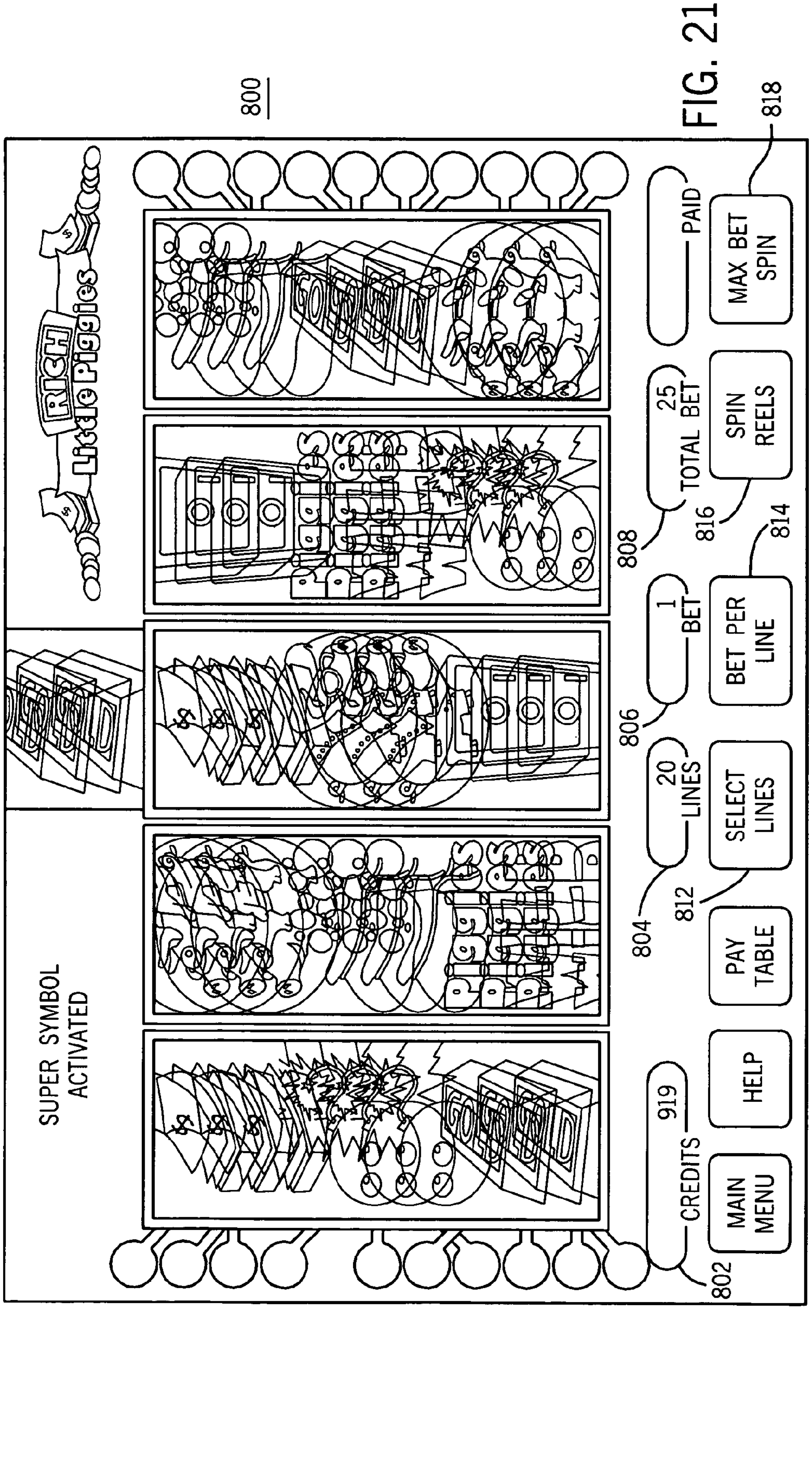
Figure 22:
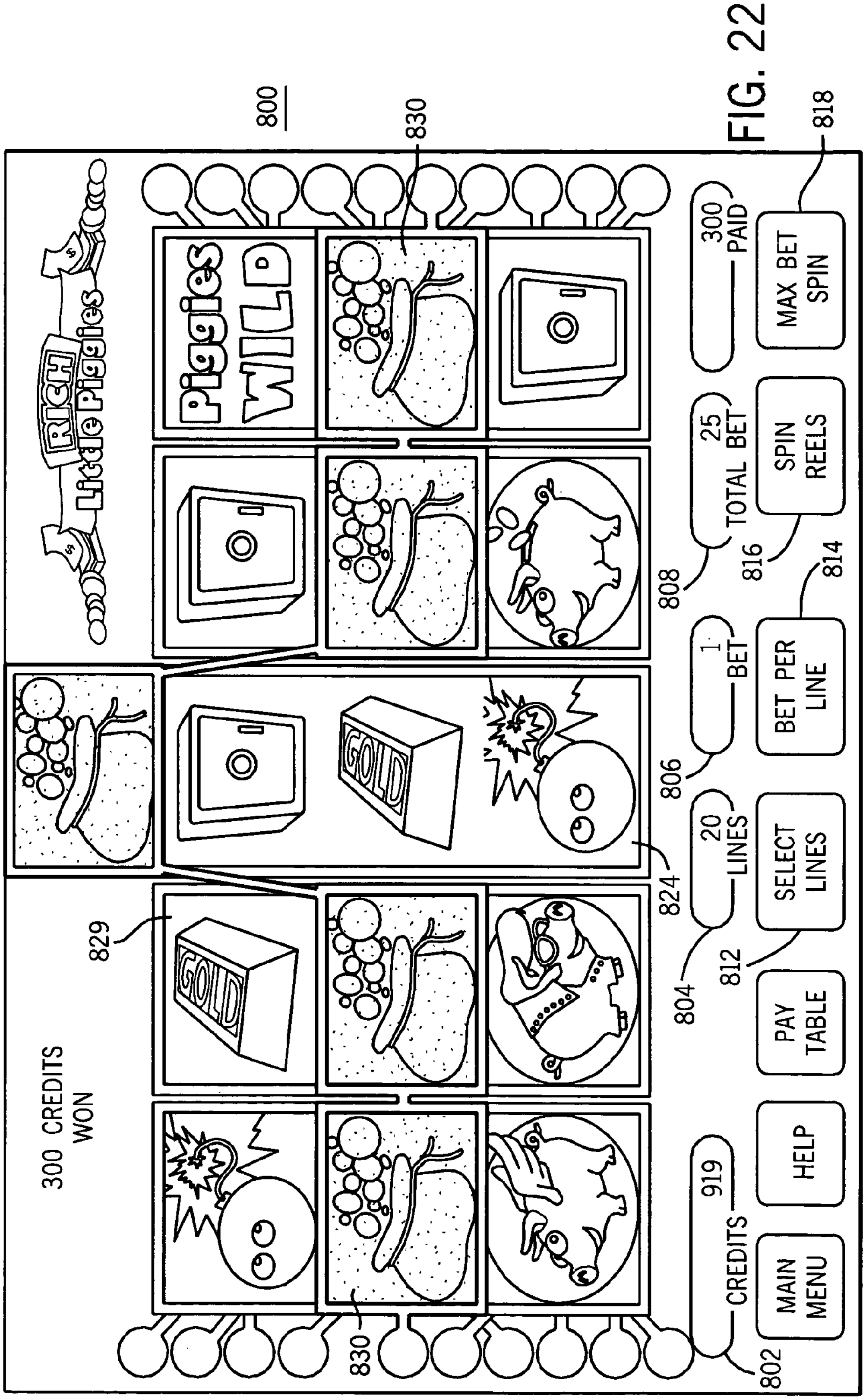

Referring to FIG. 20, upon receiving a second wager (i.e., a second amount of credits) indicating player selection of the option, the total bet indicator 808 reflects the second wager by increasing from 20 to 25 credits, the possibility of generating an extra pay line including the extra reel symbol 820 is activated and enhanced slot game play is enabled. The second credit amount is preferably directly proportional to a number of credits bet per selected pay line(s). Activating may also include changing a color of the third reel 824 and/or displaying the words "SUPER SYMBOL ACTIVATED" to notify the player of the activated state (see, FIG. 20). Next, the reels are rotated (see, FIG. 21) and stopped to display a second reel symbol array 829 (see, FIG. 22). The extra reel symbol 820 is also rotated and stopped (see, FIG. 21). If the extra reel symbol 820 (i.e., money bag) completes a winning symbol combination, the extra pay line 830 is generated including the first extra reel symbol 820 (see, FIG. 22). The extra pay line 830, including the extra reel symbol 820, may be generated to include five reel symbols in one in any number of patterns. In the illustrated example of FIG. 22, the extra symbol 820 in the extra pay line 830 creates a five moneybag combination yielding a value payout of 300 credits.

Because of the possibility of generating an extra pay line that includes the extra symbol 820, a probability of an occurrence of a winning outcome is higher in the third reel symbol array than in the second symbol array. Further, the extra pay line is generated by the controller 200 to maximize the value payout to the player.

Figure 23:
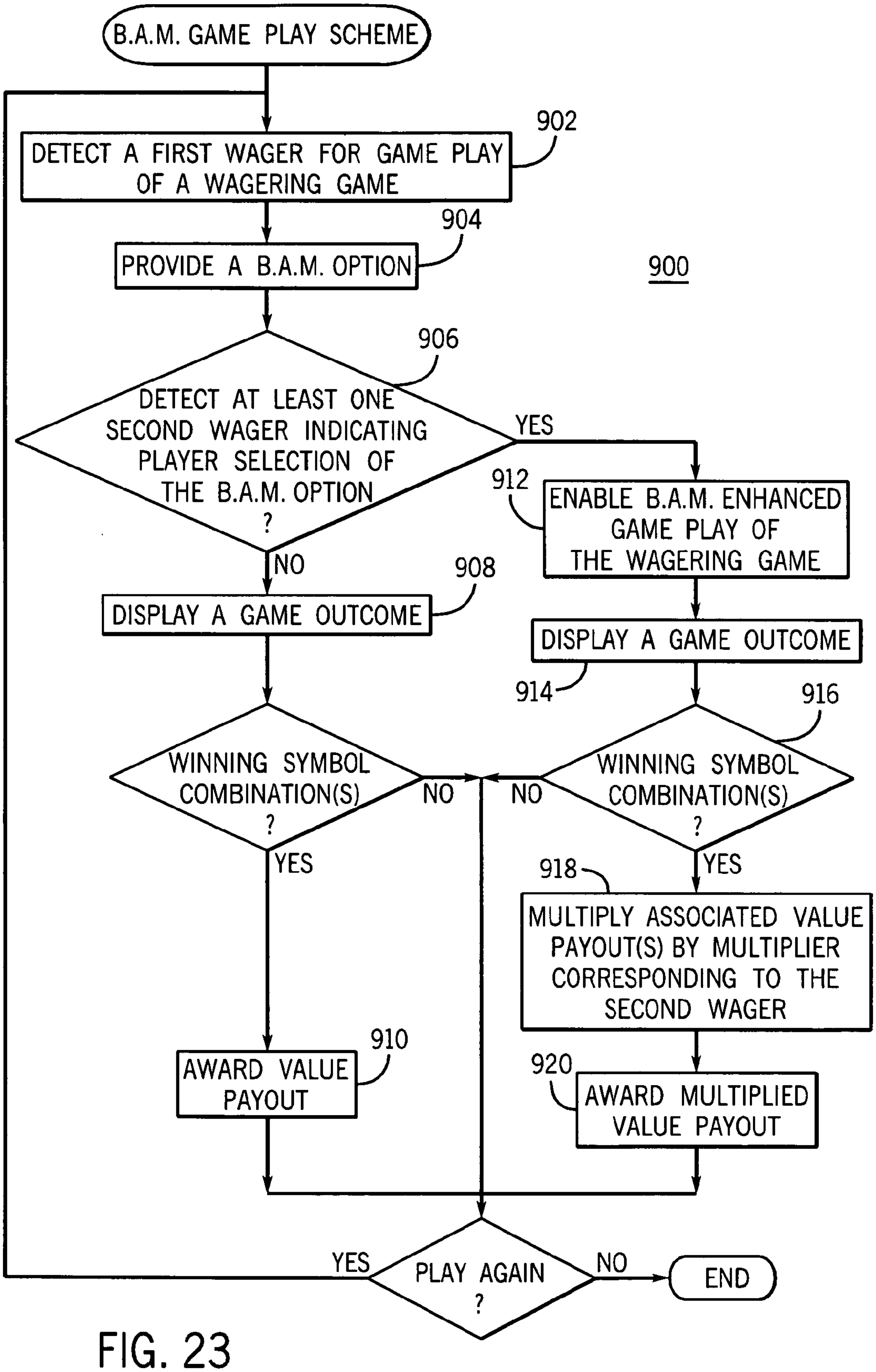
FIG. 23 is a flowchart of an embodiment of a Buy-a-Multiplier game play scheme routine that may be performed during game play of the gaming machine of FIG. 1.

In yet a further embodiment of an enhanced game play scheme routine the player may have an option to multiply a winning game outcome by a multiplier number to increase a value output. FIG. 23 is a flowchart of such an enhanced game play scheme referred to herein as a Buy-a-Multiplier (BAM) game play scheme routine 900 that may be performed during game play of the gaming machine of FIG. 1. The BAM game play scheme routine 900 provides one example of game play where, in response to receipt of an additional wager (i.e., a second wager) to select a BAM option, a player is provided with BAM enhanced game play where value payouts associated with winning game outcomes are multiplied by a predetermined number, or multiplier. The value of the multiplier number preferably corresponds to the amount of the additional, or second, wager or to the value of the symbol designated, either pre-designated or designated by the player, for inclusion in winning symbol combinations associated with multiplied value payouts. Although referred to herein as a first wager to play the wagering game and a second wager to select a BAM option, it is contemplated that the first and second wager may be combined into a single wager that includes wagering game play and selection of the BAM option.

Although discussed in the context of a video slot game, it is contemplated that the BAM game play scheme routine 900 may be adapted for any game theme. For example, the BAM game play scheme routine 900 may be adapted for a video poker game where, in response to receipt of an additional wager to select a BAM option, a value payout for one or more selected winning poker game outcomes (e.g., a poker hand including three Kings) is multiplied by a multiplier number of the selected BAM option. Similarly, the BAM game play scheme routine 900 may be adapted for a video black jack game where, in response to receipt of an additional wager to select a BAM option, the player is awarded a value payout, that may or may not be multiplied, depending on whether the player's card hand is within a certain point spread (i.e., 2 points) of the dealer's hand. The BAM game play scheme routine 900 may also be adapted for a video keno game where, in response to receipt of an additional wager to select a BAM option, a value payout for one or more winning keno game outcomes that include a specific number is multiplied by a multiplier number of the selected BAM option.

In addition, although referred to herein as a second wager, it is contemplated that the additional wager for BAM enhanced game play may be made either before or after the wager for base game play (e.g., the first wager), depending on the game design.

Player selection of the BAM option may be made via a touch screen button provided by a video gaming machine display, or it may be made via a mechanical button. The mechanical button may be an existing mechanical button on the player control panel 44, visually highlighted to direct player's attention to it at the appropriate selection time. The mechanical button may also be a "special" button configured only for BAM game play and may include a readily identifiable logo.

To increase coin-in revenue, BAM enhanced game play is preferably only available to a player when a minimum criteria is met, for example when a maximum bet is placed, or in the case of a slot game, when a maximum number of pay lines are selected for activation. It is contemplated however, that BAM enhanced game play may not be subject to a minimum wager criteria and instead be subject to a qualifying event such as the time of day, the type of game offered by the game machine 10, the popularity of the game, insertion of a player tracking card, a membership level in a player tracking club, or combinations thereof, etc.

Referring to FIG. 23, the Buy-a-Multiplier game play scheme routine 900 begins operation when the controller 200 detects a first wager for game play of the wagering game (step 902). Upon detecting the first wager, the controller 200 enables a player selectable BAM option for BAM enhanced game play (step 904) if the first wager includes a minimum criteria, for example, when a maximum number of pay lines are selected for activation for slot game play.

BAM enhanced game play may include one of any number of Buy-A-Multiplier game play schemes where value payouts associated with winning game outcomes are multiplied by a predetermined number that, for example, corresponds to a second wagered amount. The Buy-A-Multiplier game play scheme may be configured as a one game-symbol specific BAM enhanced game where value payouts associated with winning symbol combinations that include a pre-designated reel symbol may be multiplied by a fixed predetermined number. That is, for a second wager, value payouts associated with winning symbol combinations of the pre-designated game-symbol, for example, winning combinations of three, four or five cherry reel symbols, may be multiplied by a fixed predetermined number (e.g., 2×) and awarded to the player.

BAM enhanced game play may also be expanded to provide symbol specific volatility where, for one pre-designated symbol, the value of the multiplier increases as the second wager amount is increased; it is therefore not a fixed multiplier number. For example, for a second wager of one credit, a value payout associated with a winning game outcome that includes a pre-designated SEVEN reel symbol may be multiplied by 5 while, for an increased second wager of three credits, the value payout associated with a winning game outcome that includes the SEVEN reel symbol may be multiplied by 15.

BAM enhanced game play may be further expanded to provide game specific volatility, where for a particular game, the value of the multiplier number varies from reel symbol to reel symbol, with the more likely occurring reel symbols having a lower multiplier values. Although each multiplier option may result in different value payouts depending on the symbol selected, selection of any one of the symbols for inclusion in BAM game play, however, requires the same second wager amount. Thus, the player, based on his/her preference for a "lucky" symbol, or based on the different pre-assigned multiplier number values associated with the different reel symbols, can chose a particular symbol for inclusion in winning symbol combinations having multiplied value payouts. In this way, the player can control game volatility.

For example, the Buy-A-Multiplier game play scheme may be configured so that a second wager of one credit on a cherry reel symbol win yields a value payout that is 2 times the value payout of its winning symbol combination while a second wager of one credit on a SEVEN reel symbol yields a value payout that is 25 times the value payout of its winning symbol combination, where winning symbol combinations of the SEVEN reel symbol are less likely to occur than winning symbol combinations of the cherry reel symbol.

It is contemplated that the Buy-A-Multiplier game play scheme described above may be further configured to allow the player to "multiply" the multiplied value payout by multiplying the base value of the second wager. For example, the Buy-A-Multiplier game play scheme may be configured so that instead of a second wager of one credit on a cherry reel symbol win yielding a value payout that is 2 times the value payout of its winning symbol combination, a second wager of three credits on the cherry reel symbol win would yield a value payout that is 6 times the value payout of its winning symbol combination. Similarly, a second wager of five credits on the cherry symbol (rather than one credit) would yield a value payout that is 10 times the value payout of its winning symbol combination (rather than 2 times the value payout).

The Buy-A-Multiplier game play scheme may also be configured to allow the player to place simultaneous second wagers for more than one Buy-A-Multiplier option. For example, the Buy-A-Multiplier game play scheme may be configured so that a "total second wager" of 5 credits corresponds to a second wager of 2 credits for multiplying a value payout associated with a winning symbol combination of cherry reel symbols by 10× and a "third" wager of 3 credits for multiplying a value payout associated with a winning symbol combination of SEVEN reel symbols by 25×.

Further, the Buy-A-Multiplier game play scheme may be configured to allow the player to place a second wager for a Buy-A-Multiplier option where value payouts associated with all winning symbol combination are multiplied by one of a pre-determined or random multiplier number. Similarly, the Buy-A-Multiplier game play scheme may also be configured to allow the player to place a second wager for a Buy-A-Multiplier option where value payouts associated with selected winning symbol combinations including a particular symbol or symbols are multiplied by one of a pre-determined or random multiplier number. For example, for a second wager of two credits, any value payout associated with a winning game outcome that includes a cherry reel symbol may be multiplied by 5. Other reel symbols (e.g., bars, 7's, etc.) or combinations of reel symbols (e.g., cherries and/or bars, bars and/or 7's, etc.) could also be utilized.

If configured to allow the player to place simultaneous second wagers for multiple reel symbol, or to multiply the multiplied value payouts by multiplying the base value of the second wager, it is contemplated that the Buy-A-Multiplier game play scheme would preferably include a cap or maximum total second wager to prevent a player from placing excessive wagers. In addition, although five embodiments of a Buy-A-Multiplier game play scheme have been described above, additional embodiments of the Buy-A-Multiplier game play scheme are contemplated.

For example, rather than being pre-determined, the multiplier numbers may be randomly selected during game play of one or more of the Buy-A-Multiplier game play schemes discussed above. Similarly, rather than being pre-designated, the symbols may be randomly selected during game play of one or more of the Buy-A-Multiplier game play schemes discussed above.

Referring again to FIG. 23, if the controller 200 does not detect a second wager, indicating that the player has not selected the BAM option for BAM enhanced game play, game play is initiated as described in connection with FIG. 3 and a game outcome is displayed (step 908). If the game outcome includes a winning symbol combination, the player is awarded accordingly. The player may either play again if credits remain on the credit meter or may cash-out. If the game outcome does not include a winning symbol combination, the player may play again if credits remain on the credit meter or may cash-out.

Referring again to step 906, if the controller 200 detects a second wager (or a "third", etc. wager), indicating that the player has selected one or more BAM option(s) for BAM enhanced game play according to a BAM game play scheme, the controller 200 enables BAM enhanced game play (step 912). Game play is then initiated as described in connection with FIG. 3. and a game outcome is displayed (step 914).

(1) If the BAM enhanced game play scheme included one pre-designated symbol with a fixed pre-determined multiplier corresponding to a fixed second wager amount, then upon receipt of the fixed second wager amount, value payouts associated with winning symbol combinations of the one pre-designated symbol will be multiplied by the fixed pre-determined multiplier and awarded to the player (e.g., 50 credits awarded). For example, if the BAM enhanced game play scheme included one cherry reel symbol with a fixed pre-determined multiplier of 2× for a one credit second wager, then upon receipt of a one credit second wager, a value payout associated with a combination of three reels cherries having a line pay of 25 credits would be multiplied by 2× and 50 credits would be awarded to the player.

(2) If the BAM enhanced game play scheme included one pre-designated symbol with variable pre-determined multipliers corresponding to a second wager amount, then value payouts associated with winning symbol combinations of the one pre-designated symbol will be multiplied by the appropriate pre-determined multiplier (determined by the second wager amount) and awarded to the player. For example, if BAM enhanced game play included one cherry reel symbol with variable pre-determined multipliers of 2× for a one credit second wager, 5× for a three credit second wager and 25× for a five credit second wager, then upon receipt of a three credit second wager, a value payout associated with a combination of three reels cherries having a line pay of 25 credits would be multiplied by 5× and 150 credits would be awarded to the player.

(3) If the BAM enhanced game play scheme included two or more pre-designated symbols, each having a fixed pre-determined multiplier corresponding to the same fixed second wager amount, then value payouts associated with winning symbol combinations of each of the two or more pre-designated symbols would be multiplied by the appropriate pre-determined multiplier (determined by player symbol selection) and awarded to the player. For example, if BAM enhanced game play included one a cherry reel symbol with a fixed pre-determined multiplier of 2× for a one credit second wager, and a SEVEN reel symbol with a fixed pre-determined multiplier of 5× for a one credit second wager, upon player selection of the SEVEN symbol and upon receipt of a second wager of one credit, a value payout associated with a combination of three SEVEN symbols having a line pay of 20 credits would be multiplied by 5× and 100 credits would be awarded to the player.

(4) If the BAM enhanced game play scheme included two or more pre-designated symbols, each having a variable pre-determined multipliers where each variable pre-determined multiplier corresponds to a second wager amount, then value payouts associated with winning symbol combinations of each of the two or more pre-designated symbols would be multiplied by the appropriate pre-determined multiplier (determined by player symbol selection and the second wager amount) and awarded to the player. For example, if BAM enhanced game play included one cherry reel symbol with variable pre-determined multipliers of 2× for a one credit second wager, 5× for a three credit second wager and 25× for a five credit second wager, and a SEVEN reel symbol with variable pre-determined multipliers of 5× for a one credit second wager, 10× for a three credit second wager and 20× for a five credit second wager, upon detecting a player symbol selection of the SEVEN reel symbol and upon receipt of a second wager of three credits, a value payout associated with a combination of three SEVEN symbols having a line pay of 20 credits would be multiplied by 10× and 200 credits would be awarded to the player.

(5) If the BAM enhanced game play scheme included two or more pre-designated symbols, each having variable pre-determined multipliers associated with variable second wager amounts, then value payouts associated with winning symbol combinations of each of the two or more pre-designated symbols would be multiplied by the appropriate pre-determined multiplier (determined by player symbol selections and second wager amounts) and awarded to the player. For example, if BAM enhanced game play included a cherry reel symbol with variable pre-determined multipliers of 2× for a one credit second wager, 5× for a three credit second wager and 25× for a five credit second wager, and a SEVEN reel symbol with variable pre-determined multipliers of 5× for a one credit second wager, 10× for a three credit second wager and 20× for a five credit second wager, upon detecting a first player symbol selection of the SEVEN reel symbol and upon receipt of a second wager of three credits, and upon detecting a second player symbol selection of the cherry reel symbol and upon receipt of a third wager of five credits, a value payout associated with a winning symbol combination of three SEVEN symbols having a line pay of 20 credits will be multiplied by 10× and a value payout associated with a winning symbol combination of four cherry symbols having a line pay of 10 credits will be multiplied by 25× and 450 credits will be awarded to the player.

In still another embodiment of an enhanced game play scheme routine, the player may have an option to manually set-up the reel configuration of slot game reels prior to a reel spin ("manual pre-spin reel set-up"). Once the manual pre-spin reel set-up game play scheme is selected by the player, the duration of the manual pre-spin reel set-up game scheme may be one game or many games, depending on its configuration. Moreover, a bonus award (e.g., credits, free spins) may be awarded to a player if a portion of a symbol array resulting from the manual pre-spin reel set-up matches a portion of the symbol array displaying the subsequent game outcome. The portions may vary to include all or some of the symbol arrays, only winning symbol combination, selected symbols, or selected pay lines, to name a few. Although the option is preferably selected by the player upon placing a second wager, it is contemplated that the option to manually set-up the reel symbol configuration may be given to the player without the player being required to place the second wager.

Manual pre-spin reel set-up may be desirable to a player who enjoys perceiving some control over game play. By manually setting-up the reel configurations, such a player may feel that he/she has increased the odds of winning a particular symbol combination. In addition, some players may be "superstitious" and prefer that particular reel symbols be displayed prior to the reel spin. For example, on a five reel video slot machine, the player may wish to rotate video reels 1, 3 and 4 in order to align four cherry symbols on a particular pay line prior to initiating the reel spin, and seemingly increase his/her odds of displaying four cherry symbols along an activated pay line in the game outcome.

During operation, either before or after the first wager, depending on the game configuration, the player may configure the reel symbol array, or "set-up" the reels, in order to display a particular symbol pattern as mentioned above. The reel position adjustments may be made in one of any number of ways depending on the gaming machine type. For video slot machines and for mechanical spinning reel slot machines having an overlaid flat panel transmissive display, the player may adjust the reel symbols displayed on the display 12 by touching under the center of the reel symbol ("under-center") to rotate its associated reel forward. Similarly, the player may adjust the reel symbols displayed on the display 12 by touching over the center of the reel symbol ("over-center") to rotate its associated reel backwards, or vice versa. Each reel may therefore be rotated by the player to place selected symbols along activated pay lines prior to initiating and displaying the final game outcome. In the case of a mechanical spinning reel gaming machine, one or more mechanical buttons on the player control panel 44 may be utilized to allow the player to manually set-up the reel symbol configuration.

In still a further embodiment, the player may be able to manually stop selected reels in any order he/she chooses and then place an additional, or second wager, to select a BAM option to multiply a value output associated with a winning symbol combination by a multiplier number. In this case, the BAM option would be available to the player as long as the stopped reels did not indicate a winning symbol combination.

As will be appreciated by those skilled in the art, a number of other alternatives exist for enhanced game play schemes that increase the coin-in revenue per game played. For example, the player may be required to place an extra wager (i.e., the second wager) to buy virtually any feature or to make any feature available to the player.

As may be apparent from the discussion above, the gaming machine having a number of enhanced game play schemes increases coin-in revenue per game played and increases player enjoyment. Thus, unlike prior art schemes that allow a player to become eligible for possible game play via an additional wager (e.g., bonus game play, progressive jackpot game play), the gaming machine having one or more enhanced game play scheme allows a player "supersize" existing game play by enhancing base game play, enhancing bonus game play, enhancing the frequency of bonus game play, enhancing pay table value payouts, etc., via an additional wager amount.

From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

It is claimed:

1. A gaming system comprising:

a gaming machine for playing at least one casino wagering game, the casino wagering game including a base game and a bonus game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to inputs indicative of respective wagers covered by the credit balance, the wagers including a first wager and a second wager, detect the first wager on un-enhanced game play of the casino wagering game, detect the second wager enabling enhanced game play if a bonus-triggering event occurs during the casino wagering game, wherein the enhanced game play includes one or more enhancement features selected from a group consisting of (i) increasing a number of free spins of the bonus game and (ii) multiplying a standard payout associated with a designated winning symbol combination, in response to the bonus-triggering event occurring during the un-enhanced game play of the casino wagering game in which the second wager is not placed, conduct the bonus game without the one or more enhancement features of the enhanced game play, in response to the bonus-triggering event occurring during the enhanced game play of the casino wagering game in which the second wager is placed, conduct the bonus game with the one or more enhancement features, award an award for any winning outcomes of the casino wagering game, and receive, via at least one of the one or more electronic input devices, a cashout input that initiates a payout from the credit balance.

2. The gaming system of claim 1, wherein the number of free spins of the bonus game in the enhanced game play is double the number of free spins in the un-enhanced game play.

3. The gaming system of claim 1, wherein the second wager is a different amount than the first wager.

4. The gaming system of claim 1, wherein the standard payout associated with the designated winning symbol combination is multiplied by a fixed predetermined multiplier.

5. The gaming system of claim 1, wherein the standard payout associated with the designated winning symbol combination is multiplied by a random multiplier.

6. A method of operating a gaming system, the gaming system including one or more controllers and a gaming machine, the gaming machine directed to playing at least one casino wagering game including a base game and a bonus game, the gaming machine including an electronic display device and one or more electronic input devices, the method comprising:

detecting, via at least one of the one or more electronic input devices, a physical item associated with a monetary value that establishes a credit balance;

initiating the casino wagering game in response to inputs indicative of respective wagers covered by the credit balance, the wagers including a first wager and a second wager;

detecting, via at least one of the one or more electronic input devices, the first wager on un-enhanced game play of the casino wagering game;

detecting, via at least one of the one or more electronic input devices, the second wager enabling enhanced game play if a bonus-triggering event occurs during the casino wagering game, wherein the enhanced game play includes one or more enhancement features selected from a group consisting of (i) increasing a number of free spins of the bonus game and (ii) multiplying a standard payout associated with a designated winning symbol combination;

in response to the bonus-triggering event occurring during the un-enhanced game play of the casino wagering game in which the second wager is not placed, conducting, by at least one of the one or more controllers, the bonus game without the one or more enhancement features of the enhanced game play;

in response to the bonus-triggering event occurring during the enhanced game play of the casino wagering game in which the second wager is placed, conducting, by at least one of the one or more controllers, the bonus game with the one or more enhancement features;

awarding an award for any winning outcomes of the casino wagering game; and receiving, via at least one of the one or more electronic input devices, a cashout input that initiates a payout from the credit balance.

7. The method of claim 6, wherein the number of free spins in the enhanced game play is double the number of free spins in the un-enhanced game play.

8. The method of claim 6, wherein the second wager is a different amount than the first wager.

9. The method of claim 6, further comprising multiplying the standard payout with a fixed predetermined multiplier.

10. The method of claim 6, further comprising multiplying the standard payout with a random multiplier.

11. A gaming system comprising:

a gaming machine for playing at least one casino wagering game, the casino wagering game including a base game and a bonus game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to inputs indicative of respective wagers covered by the credit balance, the wagers including a first wager and a second wager, detect the first wager on un-enhanced game play of the casino wagering game, detect the second wager enabling enhanced game play, wherein the enhanced game play includes one or more enhancement features selected from a group consisting of (i) increasing a probability of triggering the bonus game and (ii) activating a wild feature, in response to the second wager not being placed, conduct the casino wagering game without the one or more enhancement features of the enhanced game play, in response to second wager being placed, conduct the casino wagering game with the one or more enhancement features, award an award for any winning outcomes of the casino wagering game, and receive, via at least one of the one or more electronic input devices, a cashout input that initiates a payout from the credit balance.

12. The gaming system of claim 11, wherein the increasing of the probability of triggering the bonus game includes lowering a threshold for an occurrence of a bonus-triggering event.

13. The gaming system of claim 11, wherein an average number of played base games between the bonus game is less in the enhanced game play than in the un-enhanced game play.

14. The gaming system of claim 11, wherein the wild feature includes an expanding wild.

15. The gaming system of claim 11, wherein the wild feature includes changing a symbol landing in an array to a wild symbol.

16. A method of operating a gaming system, the gaming system including one or more controllers and a gaming machine, the gaming machine directed to playing at least one casino wagering game including a base game and a bonus game, the gaming machine including an electronic display device and one or more electronic input devices, the method comprising:

detecting, via at least one of the one or more electronic input devices, a physical item associated with a monetary value that establishes a credit balance;

initiating the casino wagering game in response to inputs indicative of respective wagers covered by the credit balance, the wagers including a first wager and a second wager;

detecting, via at least one of the one or more electronic input devices, the first wager on un-enhanced game play of the casino wagering game;

detecting, via at least one of the one or more electronic input devices, the second wager enabling enhanced game play, wherein the enhanced game play includes one or more enhancement features selected from a group consisting of (i) increasing a probability of triggering the bonus game and (ii) activating a wild feature;

in response to the second wager not being placed, conducting, by at least one of the one or more controllers, the casino wagering game without the one or more enhancement features of the enhanced game play;

in response to the second wager being placed, conducting, by at least one of the one or more controllers, the casino wagering game with the one or more enhancement features;

awarding an award for any winning outcomes of the casino wagering game; and receiving, via at least one of the one or more electronic input devices, a cashout input that initiates a payout from the credit balance.

17. The method of claim 16, further comprising lowering a threshold for an occurrence of a bonus-triggering event.

18. The method of claim 16, wherein an average number of played base games between the bonus game is less in the enhanced game play than in the un-enhanced game play.

19. The method of claim 16, wherein the wild feature includes an expanding wild.

20. The method of claim 16, wherein the wild feature includes changing a symbol landing in an array to a wild symbol.

21. A gaming system comprising:

a gaming machine for playing at least one casino wagering game, the casino wagering game including a base game and a bonus game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to inputs indicative of respective wagers covered by the credit balance, the wagers including a first wager and a second wager, detect the first wager on un-enhanced game play of the casino wagering game, detect the second wager enabling enhanced game play, wherein the enhanced game play includes an enhancement feature in which a probability of triggering the bonus game is increased, in response to the second wager not being placed, conduct the casino wagering game without the enhancement feature of the enhanced game play, in response to the second wager being placed, conduct the casino wagering game with the enhancement feature, award an award for any winning outcomes of the casino wagering game, and receive, via at least one of the one or more electronic input devices, a cashout input that initiates a payout from the credit balance.

22. The gaming system of claim 21, wherein a threshold for an occurrence of a bonus-triggering event is lower in the enhanced game play than in the un-enhanced game play.

23. The gaming system of claim 21, wherein a number of symbols required to trigger the bonus game is lower in the enhanced game play than in the un-enhanced game play.

24. The gaming system of claim 23, wherein the symbols required to trigger the bonus game are like reel symbols scattered in a reel symbol array.

25. The gaming system of claim 21, wherein an average number of played base games between the bonus game is less in the enhanced game play than in the un-enhanced game play.

26. A gaming system comprising:

a gaming machine for playing at least one casino wagering game, the casino wagering game including a base game and a bonus game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to inputs indicative of respective wagers covered by the credit balance, the wagers including a first wager and a second wager, detect the first wager on un-enhanced game play of the casino wagering game, detect the second wager enabling enhanced game play, wherein the enhanced game play includes an enhancement feature in which a wild position is activated on one or more of a plurality of reels, in response to the second wager not being placed, conduct the casino wagering game without the enhancement feature of the enhanced game play, in response to second wager being placed, conduct the casino wagering game with the enhancement feature, award an award for any winning outcomes of the casino wagering game, and receive, via at least one of the one or more electronic input devices, a cashout input that initiates a payout from the credit balance.

27. The gaming system of claim 26, wherein the wild position is a random position.

28. The gaming system of claim 26, wherein the wild position is a predetermined position.

29. The gaming system of claim 26, wherein the wild feature includes repositioning one or more wild symbols to achieve a higher payout.

30. The gaming system of claim 26, wherein the enhanced game play causes more wilds to be displayed on average over a plurality of spins than are displayed on average in un-enhanced game play.

31. A gaming system comprising:

a gaming machine for playing at least one casino wagering game, the casino wagering game including a base game and a bonus game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to inputs indicative of respective wagers covered by the credit balance, the wagers including a first wager and a second wager, detect the first wager on un-enhanced game play of the casino wagering game, detect the second wager enabling enhanced game play if a bonus-triggering event occurs during the casino wagering game, wherein the enhanced game play includes an enhancement feature in which a number of free spins of the bonus game is increased, in response to the bonus-triggering event occurring during the un-enhanced game play of the casino wagering game in which the second wager is not placed, conduct the bonus game without the enhancement feature of the enhanced game play, in response to the bonus-triggering event occurring during the enhanced game play of the casino wagering game in which the second wager is placed, conduct the bonus game with the enhancement feature, award an award for any winning outcomes of the casino wagering game, and receive, via at least one of the one or more electronic input devices, a cashout input that initiates a payout from the credit balance.

32. The gaming system of claim 31, wherein the number of free spins of the bonus game in the enhanced game play is double the number of free spins in the un-enhanced game play.

33. The gaming system of claim 31, wherein the second wager is a different amount than the first wager.

34. The gaming system of claim 31, wherein the second wager is double the first wager, and the number of free spins of the bonus game in the enhanced game play is double the number of free spins in the un-enhanced game play.

35. The gaming system of claim 31, wherein the bonus game is a slot game.

36. A gaming system comprising:

a gaming machine for playing at least one casino wagering game, the casino wagering game including a base game and a bonus game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to inputs indicative of respective wagers covered by the credit balance, the wagers including a first wager and a second wager, detect the first wager on un-enhanced game play of the casino wagering game, detect the second wager enabling enhanced game play if a bonus-triggering event occurs during the casino wagering game, wherein the enhanced game play includes an enhancement feature in which a standard payout associated with a designated winning symbol combination is multiplied, in response to the bonus-triggering event occurring during the un-enhanced game play of the casino wagering game in which the second wager is not placed, conduct the bonus game without the enhancement feature of the enhanced game play, in response to the bonus-triggering event occurring during the enhanced game play of the casino wagering game in which the second wager is placed, conduct the bonus game with the enhancement feature, award an award for any winning outcomes of the casino wagering game, and receive, via at least one of the one or more electronic input devices, a cashout input that initiates a payout from the credit balance.

37. The gaming system of claim 36, wherein the standard payout associated with the designated winning symbol combination is multiplied by a fixed predetermined multiplier.

38. The gaming system of claim 36, wherein the standard payout associated with the designated winning symbol combination is multiplied by a random multiplier.

39. The gaming system of claim 36, wherein the standard payout associated with the designated winning symbol combination is multiplied by a variable multiplier, the variable multiplier varying in accordance with an amount of the second wager.

40. The gaming system of claim 36, wherein the standard payout is a first standard payout for a first designated winning symbol combination and a second standard payout for a second designated winning symbol combination, the first standard payout being different than the second standard payout.

* * * * *